(12) United States Patent
Behabtu et al.

(10) Patent No.: US 11,795,308 B2
(45) Date of Patent: *Oct. 24, 2023

(54) RUBBER COMPOSITIONS COMPRISING POLYSACCHARIDES

(71) Applicant: NUTRITION & BIOSCIENCES USA 4, INC., Rochester, NY (US)

(72) Inventors: Natnael Behabtu, Wilmington, DE (US); Jeffrey S. Downey, Battersea (CA); Tizazu H. Mekonnen, Kingston (CA); Christian Peter Lenges, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 0 days.
This patent is subject to a terminal disclaimer.

(21) Appl. No.: 17/739,693

(22) Filed: May 9, 2022

(65) Prior Publication Data
US 2022/0282071 A1   Sep. 8, 2022

Related U.S. Application Data

(63) Continuation of application No. 16/341,147, filed as application No. PCT/US2017/058278 on Oct. 25, 2017, now abandoned.
(Continued)

(51) Int. Cl.
*C08L 9/06* (2006.01)
*B60C 1/00* (2006.01)
(Continued)

(52) U.S. Cl.
CPC .............. *C08L 9/06* (2013.01); *B60C 1/00* (2013.01); *C08K 3/04* (2013.01); *C08K 3/06* (2013.01);
(Continued)

(58) Field of Classification Search
CPC ...... C08L 9/06; C08L 1/02; C08L 5/02; C08L 7/00; C08L 9/02; C08L 71/00;
(Continued)

(56) References Cited

U.S. PATENT DOCUMENTS

| | | | | |
|---|---|---|---|---|
| 2006/0102269 A1* | 5/2006 | Uchida | ................. | B60C 9/00 152/565 |
| 2008/0033082 A1* | 2/2008 | Hahn | ................. | B60C 1/00 524/114 |
| 2014/0179913 A1* | 6/2014 | Paullin | ................. | C12P 19/18 536/120 |

FOREIGN PATENT DOCUMENTS

EP    2781370 A1 *  9/2014   ........... B60C 9/0042

* cited by examiner

*Primary Examiner* — John E Uselding

(57) ABSTRACT

Compositions are disclosed herein comprising a rubber component and a polysaccharide, wherein the polysaccharide comprises i) poly alpha-1,3-glucan; ii) poly alpha-1,3-1,6-glucan; iii) water insoluble alpha-(1,3-glucan) polymer having 90% or greater α-1,3-glycosidic linkages, less than 1% by weight of alpha-1,3-glycosidic branch points, and a number average degree of polymerization in the range of from 55 to 10,000; iv) dextran; v) a composition comprising poly alpha-1,3-glucan ester compounds as disclosed herein; or vi) water-insoluble cellulose having a weight-average degree of polymerization (DPw) of about 10 to about 1000 and a cellulose II crystal structure. The compositions can be used in articles such as a tire, a belt, a seal, footwear, a coating, a film, or an adhesive.

24 Claims, 3 Drawing Sheets

Related U.S. Application Data

(60) Provisional application No. 62/447,506, filed on Jan. 18, 2017, provisional application No. 62/414,069, filed on Oct. 28, 2016.

(51) Int. Cl.
| | |
|---|---|
| *C08K 3/04* | (2006.01) |
| *C08K 3/06* | (2006.01) |
| *C08K 3/22* | (2006.01) |
| *C08K 3/36* | (2006.01) |
| *C08K 5/548* | (2006.01) |
| *C08L 1/02* | (2006.01) |
| *C08L 5/02* | (2006.01) |
| *C08L 7/00* | (2006.01) |
| *C08L 9/02* | (2006.01) |
| *C08L 71/00* | (2006.01) |

(52) U.S. Cl.
CPC ................. *C08K 3/22* (2013.01); *C08K 3/36* (2013.01); *C08K 5/548* (2013.01); *C08L 1/02* (2013.01); *C08L 5/02* (2013.01); *C08L 7/00* (2013.01); *C08L 9/02* (2013.01); *C08L 71/00* (2013.01); *C08K 2003/2296* (2013.01); *C08L 2203/16* (2013.01); *C08L 2205/035* (2013.01)

(58) Field of Classification Search
CPC ... C08K 3/04; C08K 3/06; C08K 3/22; C08K 3/36; C08K 5/548; B60C 1/00
See application file for complete search history.

RUBBER COMPOSITIONS COMPRISING POLYSACCHARIDES

CROSS-REFERENCE TO RELATED APPLICATIONS

This application is a continuation of application Ser. No. 16/341,147 (filed Apr. 11, 2019), which is the National Stage application of International Application No. PCT/US2017/058278 (filed Oct. 25, 2017), which claims priority to U.S. Provisional Application Nos. 62/414,069 (filed Oct. 28, 2016) and 62/447,506 (filed Jan. 18, 2017), the disclosures of which prior applications are incorporated herein by reference in their entirety.

FIELD OF THE DISCLOSURE

The present disclosure is directed towards rubber compositions comprising a rubber component and a polysaccharide. The rubber compositions can be used in articles such as a tire, a belt, a seal, footwear, a coating, a film, or an adhesive.

BACKGROUND

Rubber compositions are typically reinforced with particulates such as carbon black and silica to improve the performance characteristics and also to reduce cost. Such rubber compositions are extensively used in various applications ranging from tires to belts to footwear, because of their excellent static and dynamic mechanical, physical, and thermal properties.

Depending on their effect on the mechanical performance of rubber compositions, fillers can be classified as reinforcing, semi-reinforcing, or non-reinforcing (extending). While reinforcing fillers improve the mechanical properties of rubber compositions, non-reinforcing fillers simply act as diluents, and semi-reinforcing fillers perform both functions to some extent. The effect of fillers on rubber compositions is related to the intrinsic properties of the filler, for example the particle size, size distribution, shape, and the interfacial interaction between the rubber polymer/elastomer and the filler. Although carbon black is the dominant filler used in the rubber industry due to its reinforcing effect, other fillers such as carbonates, clays, silicas, silicates, talc, and titanium dioxide are also used.

There is growing interest in replacing or complementing the carbon black in rubber compositions with renewable fillers such as cellulosic fibers. Besides renewability, such materials can offer an improved environmental footprint over that associated with the process of producing carbon black from oil and gas, and reduced energy consumption in the processing of rubber with the filler. For example, tire manufacturers are interested in rubber compositions which provide low rolling resistance, high wet traction, and long life time. There is also significant interest in rubber compositions which can provide energy savings through better processibility, lighter weight, reduced cost, and inclusion of renewable ingredients without compromising the performance.

There is a growing need for renewable materials which can replace incumbent ingredients in rubber compositions while providing improved properties, such as reduced rolling resistance.

SUMMARY

Disclosed herein are rubber compositions, the rubber compositions comprising:

a) a rubber component; and
b) a polysaccharide;
wherein the polysaccharide comprises:
i) poly alpha-1,3-glucan;
ii) poly alpha-1,3-1,6-glucan;
iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000;
iv) dextran;
v) a composition comprising a poly alpha-1,3-glucan ester compound represented by Structure I:

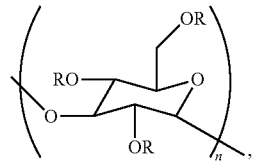

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 0.1; or
iv) water-insoluble cellulose having a weight-average degree of polymerization (DPw) of about 10 to about 1000 and a cellulose II crystal structure.

In one embodiment, the rubber component comprises at least one diene-based sulfur-vulcanizable elastomer having a Tg below −30° C., as determined by dynamic mechanical analysis. In another embodiment, the elastomer comprises natural rubber, synthetic polyisoprene, styrene butadiene copolymer rubber, ethylene propylene diene monomer rubber, hydrogenated nitrile butadiene rubber, polybutadiene, silicone rubber, or neoprene.

In a further embodiment, the polysaccharide comprises particles having an average particle size in at least one dimension in the range of from about 5 nm to about 200 μm. In yet another embodiment, the polysaccharide comprises a polysaccharide characterized by a surface area in the range of from about 0.1 m²/g to about 200 m²/g, as determined by Brunauer-Emmett-Teller measurement method.

In one embodiment, the polysaccharide comprises poly alpha-1,3-glucan. In another embodiment, the polysaccharide comprises poly alpha-1,3-1,6-glucan. In an additional embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000. In yet another embodiment, the polysaccharide comprises dextran.

In still another embodiment, the polysaccharide comprises a composition comprising a poly alpha-1,3-glucan ester compound represented by Structure I:

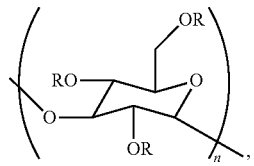

Structure I wherein
(A) n is at least 6;
(B) each R is independently an —H or a first group comprising —CO—C$_x$—COOH, wherein the —C$_x$— portion of said first group comprises a chain of 2 to 6 carbon atoms; and
(C) the compound has a degree of substitution with the first group of about 0.001 to about 0.1. In a further embodiment, the poly alpha-1,3-glucan ester compound comprises poly alpha-1,3-glucan succinate.

In a further embodiment, the polysaccharide comprises water-insoluble cellulose having a weight-average degree of polymerization (DPw) of about 10 to about 1000 and a cellulose II crystal structure.

In still another embodiment, the polysaccharide comprises an enzymatically-produced polysaccharide.

In one embodiment, the rubber composition comprises from about 5 to about 100 parts per hundred of polysaccharide, based on the weight fraction of the rubber component. In another embodiment, the rubber composition further comprises at least one of carbon black or silica. In yet another embodiment, the rubber composition further comprises at least one of a filler, an antioxidant, an antiozonant, a processing aid, a compatibilizer, a bonding agent, a tackifier, a curing agent, an accelerator, a coupling agent, or a combination thereof. In an additional embodiment, the rubber composition further comprises a polyetheramine.

In yet another embodiment, the rubber component comprises styrene butadiene copolymer rubber or hydrogenated nitrile butadiene rubber, and the polysaccharide comprises poly alpha-1,3-glucan.

Also disclosed herein are articles comprising the rubber composition. In one embodiment, the article is a tire, a belt, a seal, footwear, a valve, tubing, a mat, a gasket, a coating, a film, or an adhesive.

BRIEF DESCRIPTION OF THE DRAWINGS

The disclosure is illustrated by way of example and not limited to the accompanying figures.

DETAILED DESCRIPTION

Figure 1A:
FIG. 1A is a reproduction of a photograph of the rubber composition of Example 1A.

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "rubber", "rubber component", and "elastomer" may be used interchangeably, unless expressly indicated otherwise. The terms "rubber compound", "compounded rubber" and "rubber composition" may be used interchangeably to refer to "rubber that has been blended or mixed with various ingredients and materials".

The terms "cure" and "vulcanize" may be used interchangeably unless otherwise indicated. Rubber compounds are typically cured using sulfur or peroxide-based curing agents. Typical sulfur-based curing agents for rubber compounds include elemental sulfur, sulfur-containing resins, sulfur-olefin adducts, and cure accelerators.

As used herein, "filler" means particles added to a rubber composition to lower the amount of more expensive material in the composition, and/or to improve the properties of the composition.

As used herein, "antiozonant" means an organic compound used to prevent or retard degradation caused by ozone.

As used herein, "processing aid" means a compound added to rubber compositions during processing to make mixing and extrusion easier.

As used herein, "compatibilizer" means compounds which promote interfacial adhesion between immiscible polymers.

As used herein, "bonding agent" means a substance applied to a substrate to create a bond between it and a succeeding layer.

As used herein, "tackifier" means a low-molecular weight compound with high glass transition temperature used in formulating adhesives to increase the tack.

As used herein, "accelerator" means a compound added to a rubber compound to increase the speed of vulcanization and to permit vulcanization to proceed at lower temperature and with greater efficiency.

As used herein, "coupling agent" means a compound which provides a chemical bond between two dissimilar materials, such as an inorganic material and an organic material.

The term "phr" refers to parts by weight of a respective material per 100 parts by weight of rubber.

As used herein, the term "polysaccharide" means a polymeric carbohydrate molecule composed of long chains of monosaccharide units bound together by glycosidic linkages and on hydrolysis give the constituent monosaccharides or oligosaccharides.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 90%, 100%, 125%, 150%, 175%, or 200% (or any integer between 1% and 200%) more than the quantity or activity for which the increased quantity or activity is being compared.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

An "aqueous composition" herein refers to a solution or mixture in which the solvent is at least about 20 wt % water, for example, and which comprises a polysaccharide such as poly alpha-1,3-1,6-glucan. Examples of aqueous compositions herein are aqueous solutions and hydrocolloids.

A "colloid" herein refers to a substance that is microscopically dispersed throughout another substance. Therefore, a hydrocolloid herein can also refer to a dispersion, emulsion, mixture, or solution of a polysaccharide, for example, poly alpha-1,3-1,6-glucan or poly alpha-1,3-glucan, in water or aqueous solution.

As used herein, "weight average molecular weight" or "$M$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by techniques such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by techniques such as gel permeation chromatography, viscometry via the (Mark-Houwink equation), and colligative methods such as vapor pressure osmometry, end-group determination, or proton NMR.

The present disclosure is directed to a rubber composition comprising, or consisting essentially of:
a) a rubber component; and
b) a polysaccharide;
wherein the polysaccharide comprises:
  i) poly alpha-1,3-glucan;
  ii) poly alpha-1,3-1,6-glucan;
  iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000;
  iv) dextran; or
  v) a composition comprising a poly alpha-1,3-glucan ester compound represented by Structure I:

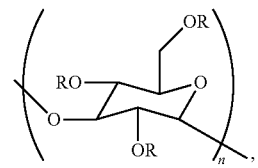

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 0.1.

In some embodiments, the polysaccharide functions as a non-reinforcing filler and has little effect on the mechanical properties of the rubber composition, as compared to the mechanical properties of the same rubber composition except lacking the polysaccharide. As a non-reinforcing filler, the polysaccharide may provide light weighting to the rubber composition. In other embodiments, the polysaccharide functions as a reinforcing filler and provides improved mechanical properties of the rubber composition, as compared to the mechanical properties of the same rubber composition except lacking the polysaccharide.

The rubber compositions can be used to make rubber-containing articles such as tires, tire tread, tire sidewall, belts such as conveyor belts or power transmission belts, gaskets, seals, footwear, and other articles. The rubber compositions can also be used in a coating, a film, or an adhesive. Polysaccharide-containing rubber compositions offer benefits such as energy savings through better processibility, lighter weight, reduced cost, increased wet traction, reduced rolling resistance, lower density, and inclusion of renewable ingredients without compromising the performance.

Rubber compositions typically comprise a rubber component, fillers, and various other ingredients. Suitable rubber components include one or more diene-based sulfur-vulcanizable elastomers having a glass transition temperature (Tg) below −30° C., as determined, for example, by dynamic mechanical analysis.

In one embodiment, the rubber component can be any suitable elastomer or combination of elastomers such as, for example, natural rubber, synthetic polyisoprene, polybutadiene rubber, styrene/butadiene copolymer rubber (prepared by aqueous emulsion or organic solvent polymerization), ethylene propylene diene monomer rubber, hydrogenated nitrile butadiene rubber, neoprene, styrene/isoprene/butadiene terpolymer rubber, butadiene/acrylonitrile rubber, polyisoprene rubber, isoprene/butadiene copolymer rubber, nitrile rubber, ethylene-acrylic rubber, butyl and halobutyl rubber, chlorosulfonated polyethylene, fluoroelastomer, hydrocarbon rubber, polybutadiene, silicone rubber, and combinations thereof. As used herein, the term "neoprene" is synonymous with polychloroprene and refers to synthetic rubber produced ty the polymerization of chloroprene, including sulfur-modified chloroprene. In one embodiment, the rubber component comprises natural rubber, synthetic polyisoprene, styrene butadiene copolymer rubber, ethylene propylene diene monomer rubber, hydrogenated nitrile rubber, polybutadiene, silicone rubber, or neoprene. In one embodiment, the rubber component comprises natural rubber. In one embodiment, the rubber component comprises synthetic polyisoprene. In one embodiment, the rubber component comprises styrene butadiene copolymer rubber. In one embodiment, the rubber component comprises ethylene propylene diene monomer rubber. In one embodiment, the rubber component comprises hydrogenated nitrile butadiene rubber. In one embodiment, the rubber component comprises polybutadiene. In one embodiment, the rubber component comprises neoprene. In one embodiment, the rubber component comprises silicone rubber. Such materials can be obtained commercially or prepared by methods known in the art.

In one embodiment, the rubber compositions disclosed herein comprise a rubber component and a polysaccharide, wherein the polysaccharide comprises particles having an average particle size in at least one dimension in the range of from about 20 nm to about 200 μm (200,000 nm). In another embodiment, the polysaccharide comprises particles having an average particle size in at least one dimension in the range of from about 5 nm to about 200 μm (200,000 nm). For example, the average particle size in at least one dimension can be 5, 10, 15, 20; 30; 40; 50; 60; 70; 80; 90; 100; 150; 200; 250; 300; 350; 400; 450; 500; 550; 600; 700; 800; 900; 1000; 1500; 2000; 2500; 5000; 7500; 10,000; 15,000; 20,000; 30,000; 40,000; 50,000; 60,000; 70,000; 80,000; 90,000; 100,000; 125,000; 150,000; 175,000; or 200,000 (or any value between 5 and 200,000) nm. In a further embodiment, the rubber compositions comprise a rubber component and a polysaccharide, wherein the polysaccharide comprises particles having an average particle size in at least one dimension in the range of from about 20 nm, or from about 5 nm, to about 200 μm (200,000 nm) and an aspect ratio of about 1.

In another embodiment, the polysaccharide comprises a nanostructured polysaccharide characterized by a surface area in the range of from about 0.1 $m^2/g$ to about 200 $m^2/g$, as determined by the Brunauer-Emmett-Teller (BET) measurement method. For example, the BET surface area can be 0.1, 0.2, 0.3, 0.4, 0.5, 0.6, 0.7, 0.8, 0.9, 1, 2, 3, 4, 5, 6, 7, 8, 9, 10, 15, 20 25, 30 35, 40 45, 50, 55, 60, 65, 70, 75, 80, 85, 90, 95, 100, 110, 120, 130, 140, 150, 160, 170, 180, 190, or 200 (or any value between 0.1 and 200) $m^2/g$.

In yet another embodiment, the polysaccharide has a zeta potential in the range of −2 mV to −50 mV. For example, the polysaccharide can have a zeta potential of −2, −3, −4, −5, −6, −7, −8, −9, −10, −12, −14, −16, −18, −20, −25, −30, −35, −40, −45, −50 (or any value between −2 and −50) mV. Zeta potential is an extrinsic property of a particle in liquid that arises from interactions between the surface and ions in the liquid. The measured value depends on temperature, the surface chemistry, and the type and concentration of ions in the liquid. When placed in water, ions will adsorb preferentially to the surface depending on the charge state of the surface. As counter ions move to maintain the electrical neutrality of the system, a "double layer" of opposing charges is set up around the particle. The zeta potential is defined to be the potential at the slip plane (which is equidistant between the adsorbed and diffuse charges). Since the zeta potential is related to the amount of charge on the surface of the particles, a strong zeta potential can help to stabilize the particles against agglomeration electrodynamically.

Various polysaccharides are useful as components in the rubber compositions disclosed herein. In one embodiment, suitable polysaccharides comprise:

i) poly alpha-1,3-glucan;
ii) poly alpha-1,3-1,6-glucan;
iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000;

iv) dextran;

v) a composition comprising a poly alpha-1,3-glucan ester compound represented by Structure I:

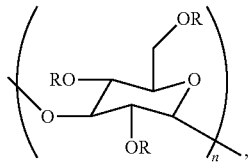

Structure I wherein (A) n is at least 6;

(B) each R is independently an —H or a first group comprising —CO—$C_x$—COOH, wherein the —$C_x$— portion of said first group comprises a chain of 2 to 6 carbon atoms; and (C) the compound has a degree of substitution with the first group of about 0.001 to about 0.1; or vi) water-insoluble cellulose having a weight-average degree of polymerization (DPw) of about 10 to about 1000 and a cellulose II crystal structure. Mixtures of these polysaccharides can also be used.

In one embodiment, the polysaccharide comprises poly alpha-1,3-glucan. The terms "poly alpha-1,3-glucan", "alpha-1,3-glucan polymer" and "glucan polymer" are used interchangeably herein. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows:

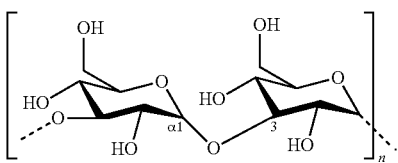

The poly alpha-1,3-glucan can be prepared using chemical methods, or it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes, as described in U.S. Pat. Nos. 7,000,000; 8,642,757; and 9,080,195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

The poly alpha-1,3-glucan can be used as a dry powder, for example, containing less than 5% by weight or water, or in other embodiments, the poly alpha-1,3-glucan can be used a wet cake, containing greater than 5% by weight of water. In one embodiment, the poly alpha-1,3-glucan can be used as a colloidal dispersion. In another embodiment, the poly alpha-1,3-glucan can be used in fibrid form.

In one embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

In one embodiment, the polysaccharide is poly alpha-1,3-1,6-glucan. In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 1000; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages. The term "alpha-1,6-glycosidic linkage" as used herein refers to the covalent bond that joins alpha-D-glucose molecules to each other through carbons 1 and 6 on adjacent alpha-D-glucose rings.

Poly alpha-1,3-1,6-glucan is a product of a glucosyltransferase enzyme, as disclosed in United States Patent Application Publication 2015/0232785 A1.

The glycosidic linkage profile of a glucan or dextran can be determined using any method known in the art. For example, a linkage profile can be determined using methods that use nuclear magnetic resonance (NMR) spectroscopy (e.g., $^{13}C$ NMR or $^1H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Flordia, 2005), which is incorporated herein by reference.

The terms "poly alpha-1,3-1,6-glucan", "alpha-1,3-1,6-glucan polymer", and "poly (alpha-1,3)(alpha-1,6) glucan" are used interchangeably herein (note that the order of the linkage denotations "1,3" and "1,6" in these terms is of no moment). Poly alpha-1,3-1,6-glucan herein is a polymer comprising glucose monomeric units linked together by glycosidic linkages (i.e., glucosidic linkages), wherein at least about 30% of the glycosidic linkages are alpha-1,3-glycosidic linkages, and at least about 30% of the glycosidic linkages are alpha-1,6-glycosidic linkages. Poly alpha-1,3-1,6-glucan is a type of polysaccharide containing a mixed glycosidic linkage content. The meaning of the term poly alpha-1,3-1,6-glucan in certain embodiments herein excludes "alternan," which is a glucan containing alpha-1,3 linkages and alpha-1,6 linkages that consecutively alternate with each other (U.S. Pat. No. 5,702,942, U.S. Pat. Appl. Publ. No. 2006/0127328). Alpha-1,3 and alpha-1,6 linkages that "consecutively alternate" with each other can be visually represented by . . . G-1,3-G-1,6-G-1,3-G-1,6-G-1,3-G-1,6-G-1,3-G- . . . , for example, where G represents glucose.

The "molecular weight" of a poly alpha-1,3-1,6-glucan herein can be represented as number-average molecular weight ($M_n$) or as weight-average molecular weight ($M_w$). Alternatively, molecular weight can be represented as Daltons, grams/mole, $DP_w$ (weight average degree of polymerization), or $DP_n$ (number average degree of polymerization). Various means are known in the art for calculating these molecular weight measurements such as with high-pressure liquid chromatography (HPLC), size exclusion chromatography (SEC), or gel permeation chromatography (GPC).

In some embodiments:
(i) at least 30% of the glycosidic linkages of the poly alpha-1,3-1,6-glucan are alpha-1,3 linkages,
(ii) at least 30% of the glycosidic linkages of the poly alpha-1,3-1,6-glucan are alpha-1,6 linkages,
(iii) the poly alpha-1,3-1,6-glucan has a weight average degree of polymerization ($DP_w$) of at least 1000; and
(iv) the alpha-1,3 linkages and alpha-1,6 linkages of the poly alpha-1,3-1,6-glucan do not consecutively alternate with each other.

At least 30% of the glycosidic linkages of poly alpha-1,3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

Other examples of alpha-1,3 and alpha-1,6 linkage profiles and methods for their product are disclosed in published United States patent application 2015/0232785. The linkages and DPw of Glucan produced by various Gtf Enzymes, as disclosed in US 2015/0232785, are listed below in Table 1A.

TABLE 1A

Linkages and $DP_w$ of Glucan Produced by Various Gtf Enzymes

| Gtf | Glucan Alpha Linkages | | $DP_w$ |
|---|---|---|---|
| | % 1,3 | % 1,6 | |
| 4297 | 31 | 67 | 10540 |
| 3298 | 50 | 50 | 1235 |
| 0544 | 62 | 36 | 3815 |
| 5618 | 34 | 66 | 3810 |
| 2379 | 37 | 63 | 1640 |

The backbone of a poly alpha-1,3-1,6-glucan disclosed herein can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G- . . . (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan useful in rubber compositions can have a $DP_w$ of at least about 1000. For example, the $DP_w$ of the poly alpha-1,3-1,6-glucan can be at least about 10000. Alternatively, the $DP_w$ can be at least about 1000 to about 15000. Alternatively still, the $DP_w$ can be at least about 1000, 2000, 3000, 4000, 5000, 6000, 7000, 8000, 9000, 10000, 11000, 12000, 13000, 14000, or 15000 (or any integer between 1000 and 15000), for example. Given that a poly alpha-1,3-1,6-glucan herein can have a $DP_w$ of at least about 1000, such a glucan polymer is typically water-insoluble.

A poly alpha-1,3-1,6-glucan herein can have an $M_w$ of at least about 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 4000, 5000, 10000, 20000, 30000, or 40000, for example.

A poly alpha-1,3-1,6-glucan herein can comprise at least 20 glucose monomeric units, for example. Alternatively, the number of glucose monomeric units can be at least 25, 50, 100, 500, 1000, 2000, 3000, 4000, 5000, 6000, 7000, 8000, or 9000 (or any integer between 10 and 9000), for example.

Poly alpha-1,3-1,6-glucan can be used as a dry powder or as a wet cake containing greater than 5% by weight of water. In one embodiment, the poly alpha-1,3-1,6-glucan can be used as a colloidal dispersion. In another embodiment, the poly alpha-1,3-1,6-glucan can be used in fibrid form.

In some embodiments, the polysaccharide comprises dextran. In one embodiment, the dextran comprises:
(i) 87-93% alpha-1,6 glycosidic linkages;
(ii) 0.1-1.2% alpha-1,3-glycosidic linkages;
(iii) 0.1-0.7% alpha-1,4-glycosidic linkages;
(iv) 7.7-8.6% alpha-1,3,6-glycosidic linkages;
(v) 0.4-1.7% alpha-1,2,6-glycosidic or alpha-1,4,6-glycosidic linkages
wherein the weight-average molecular weight (Mw) of the dextran is about 50-200 million Daltons, the z-average radius of gyration of the dextran is about 200-280 nm. Optionally, the dextran is not a product of *Leuconostoc mesenteroides* glucosyltransferase enzyme. In other embodiments, the coating composition consists essentially of the dextran polymer having (i) about 89.5-90.5 wt % glucose linked at positions 1 and 6; (ii) about 0.4-0.9 wt % glucose linked at positions 1 and 3; (iii) about 0.3-0.5 wt % glucose linked at positions 1 and 4; (iv) about 8.0-8.3 wt % glucose linked at positions 1, 3 and 6; and (v) about 0.7-1.4 wt % glucose linked at: (a) positions 1, 2 and 6, or (b) positions 1, 4 and 6.

The terms "dextran", "dextran polymer" and "dextran compound" are used interchangeably herein and refer to complex, branched alpha-glucans generally comprising chains of substantially (mostly) alpha-1,6-linked glucose monomers, with side chains (branches) linked mainly by alpha-1,3-linkage. The term "gelling dextran" herein refers to the ability of one or more dextrans disclosed herein to form a viscous solution or gel-like composition (i) during enzymatic dextran synthesis and, optionally, (ii) when such synthesized dextran is isolated (e.g., >90% pure) and then placed in an aqueous composition.

Dextran "long chains" herein can comprise "substantially [or mostly] alpha-1,6-glycosidic linkages", meaning that they can have at least about 98.0% alpha-1,6-glycosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and comprising less than about 10% of all the glucose monomers of a dextran polymer. Such short chains typically comprise alpha-1,2-, alpha-1,3-, and/or alpha-1,4-glycosidic linkages (it is believed that there can also be a small percentage of such non-alpha-1,6 linkages in long chains in some aspects).

The "molecular weight" of dextran herein can be represented as number-average molecular weight ($M_n$) or as weight-average molecular weight (Mw), the units of which are in Daltons or grams/mole. Alternatively, molecular weight can be represented as DPw (weight average degree of polymerization) or DPn (number average degree of polymerization). Various means are known in the art for calculating these molecular weight measurements such as with high-pressure liquid chromatography (HPLC), size exclusion chromatography (SEC), or gel permeation chromatography (GPC).

The term "radius of gyration" (Rg) herein refers to the mean radius of dextran, and is calculated as the root-mean-square distance of a dextran molecule's components (atoms) from the molecule's center of gravity. Rg can be provided in Angstrom or nanometer (nm) units, for example. The "z-average radius of gyration" of dextran herein refers to the Rg of dextran as measured using light scattering (e.g., MALS). Methods for measuring z-average Rg are known and can be used herein, accordingly. For example, z-average Rg can be measured as disclosed in U.S. Pat. No. 7,531,073, U.S. Patent Appl. Publ. Nos. 2010/0003515 and 2009/0046274, Wyatt (*Anal. Chim. Acta* 272:1-40), and Mori and Barth (Size Exclusion Chromatography, Springer-Verlag, Berlin, 1999), all of which are incorporated herein by reference.

The dextran polymer can be produced via an enzymatic process using glucosyltransferase enzyme comprising an amino acid sequence that is described in United States Patent Application Publication 2016/0122445 A1. In some embodiments, the dextran can comprise (i) about 87-93 wt % glucose linked only at positions 1 and 6; (ii) about 0.1-1.2 wt % glucose linked only at positions 1 and 3; (iii) about 0.1-0.7 wt % glucose linked only at positions 1 and 4; (iv)

about 7.7-8.6 wt % glucose linked only at positions 1, 3 and 6; and (v) about 0.4-1.7 wt % glucose linked only at: (a) positions 1, 2 and 6, or (b) positions 1, 4 and 6. In certain embodiments, a dextran can comprise (i) about 89.5-90.5 wt % glucose linked only at positions 1 and 6; (ii) about 0.4-0.9 wt % glucose linked only at positions 1 and 3; (iii) about 0.3-0.5 wt % glucose linked only at positions 1 and 4; (iv) about 8.0-8.3 wt % glucose linked only at positions 1, 3 and 6; and (v) about 0.7-1.4 wt % glucose linked only at: (a) positions 1, 2 and 6, or (b) positions 1, 4 and 6.

In other embodiments, the dextran polymer can comprise about 87, 87.5, 88, 88.5, 89, 89.5, 90, 90.5, 91, 91.5, 92, 92.5, or 93 wt % glucose linked only at positions 1 and 6. There can be about 87-92.5, 87-92, 87-91.5, 87-91, 87-90.5, 87-90, 87.5-92.5, 87.5-92, 87.5-91.5, 87.5-91, 87.5-90.5, 87.5-90, 88-92.5, 88-92, 88-91.5, 88-91, 88-90.5, 88-90, 88.5-92.5, 88.5-92, 88.5-91.5, 88.5-91, 88.5-90.5, 88.5-90, 89-92.5, 89-92, 89-91.5, 89-91, 89-90.5, 89-90, 89.5-92.5, 89.5-92, 89.5-91.5, 89.5-91, or 89.5-90.5 wt % glucose linked only at positions 1 and 6, in some instances.

In other embodiments, the dextran polymer can comprise about 0.1, 0.2, 0.3, 0.4, 0.5, 0.6, 0.7, 0.8, 0.9, 1.0, 1.1, or 1.2 wt % glucose linked only at positions 1 and 3. There can be about 0.1-1.2, 0.1-1.0, 0.1-0.8, 0.3-1.2, 0.3-1.0, 0.3-0.8, 0.4-1.2, 0.4-1.0, 0.4-0.8, 0.5-1.2, 0.5-1.0, 0.5-0.8, 0.6-1.2, 0.6-1.0, or 0.6-0.8 wt % glucose linked only at positions 1 and 3, in some instances.

In other embodiments, the dextran polymer can comprise about 0.1, 0.2, 0.3, 0.4, 0.5, 0.6, or 0.7 wt % glucose linked only at positions 1 and 4. There can be about 0.1-0.7, 0.1-0.6, 0.1-0.5, 0.1-0.4, 0.2-0.7, 0.2-0.6, 0.2-0.5, 0.2-0.4, 0.3-0.7, 0.3-0.6, 0.3-0.5, or 0.3-0.4 wt % glucose linked only at positions 1 and 4, in some instances.

In other embodiments, the dextran polymer can comprise about 7.7, 7.8, 7.9, 8.0, 8.1, 8.2, 8.3, 8.4, 8.5, or 8.6 wt % glucose linked only at positions 1, 3 and 6. There can be about 7.7-8.6, 7.7-8.5, 7.7-8.4, 7.7-8.3, 7.7-8.2, 7.8-8.6, 7.8-8.5, 7.8-8.4, 7.8-8.3, 7.8-8.2, 7.9-8.6, 7.9-8.5, 7.9-8.4, 7.9-8.3, 7.9-8.2, 8.0-8.6, 8.0-8.5, 8.0-8.4, 8.0-8.3, 8.0-8.2, 8.1-8.6, 8.1-8.5, 8.1-8.1, 8.1-8.3, or 8.1-8.2 wt % glucose linked only at positions 1, 3 and 6, in some instances.

In other embodiments, the dextran polymer can comprise about 0.4, 0.5, 0.6, 0.7, 0.8, 0.9, 1.0, 1.1, 1.2, 1.3, 1.4, 1.5, 1.6, or 1.7 wt % glucose linked only at (a) positions 1, 2 and 6, or (b) positions 1, 4 and 6. There can be about 0.4-1.7, 0.4-1.6, 0.4-1.5, 0.4-1.4, 0.4-1.3, 0.5-1.7, 0.5-1.6, 0.5-1.5, 0.5-1.4, 0.5-1.3, 0.6-1.7, 0.6-1.6, 0.6-1.5, 0.6-1.4, 0.6-1.3, 0.7-1.7, 0.7-1.6, 0.7-1.5, 0.7-1.4, 0.7-1.3, 0.8-1.7, 0.8-1.6, 0.8-1.5, 0.8-1.4, 0.8-1.3 wt % glucose linked only at (a) positions 1, 2 and 6, or (b) positions 1, 4 and 6, in some instances.

It is believed that dextran herein may be a branched structure in which there are long chains (containing mostly or all alpha-1,6-linkages) that iteratively branch from each other (e.g., a long chain can be a branch from another long chain, which in turn can itself be a branch from another long chain, and so on). The branched structure may also comprise short branches from the long chains; these short chains are believed to mostly comprise alpha-1,3 and -1,4 linkages, for example. Branch points in the dextran, whether from a long chain branching from another long chain, or a short chain branching from a long chain, appear to comprise alpha-1,3, -1,4, or -1,2 linkages off of a glucose involved in alpha-1,6 linkage. On average, about 20%, 21%, 22%, 23%, 24%, 25%, 26%, 27%, 28%, 29%, 30%, 15-35%, 15-30%, 15-25%, 15-20%, 20-35%, 20-30%, 20-25%, 25-35%, or 25-30% of all branch points of dextran in some embodiments branch into long chains. Most (>98% or 99%) or all the other branch points branch into short chains.

The long chains of a dextran branching structure can be similar in length in some aspects. By being similar in length, it is meant that the length (DP) of at least 70%, 75%, 80%, 85%, or 90% of all the long chains in a branching structure is within plus/minus 15% (or 10%, 5%) of the mean length of all the long chains of the branching structure. In some aspects, the mean length (average length) of the long chains is about 10-50 DP (i.e., 10-50 glucose monomers). For example, the mean individual length of the long chains can be about 10, 15, 16, 17, 18, 19, 20, 21, 22, 23, 24, 25, 30, 35, 40, 45, 50, 10-50, 10-40, 10-30, 10-25, 10-20, 15-50, 15-40, 15-30, 15-25, 15-20, 20-50, 20-40, 20-30, or 20-25 DP.

Dextran long chains in certain embodiments can comprise substantially alpha-1,6-glycosidic linkages and a small amount (less than 2.0%) of alpha-1,3- and/or alpha-1,4-glycosidic linkages. For example, dextran long chains can comprise about, or at least about, 98%, 98.25%, 98.5%, 98.75%, 99%, 99.25%, 99.5%, 99.75%, or 99.9% alpha-1,6-glycosidic linkages. A dextran long chain in certain embodiments does not comprise alpha-1,4-glycosidic linkages (i.e., such a long chain has mostly alpha-1,6 linkages and a small amount of alpha-1,3 linkages). Conversely, a dextran long chain in some embodiments does not comprise alpha-1,3-glycosidic linkages (i.e., such a long chain has mostly alpha-1,6 linkages and a small amount of alpha-1,4 linkages). Any dextran long chain of the above embodiments may further not comprise alpha-1,2-glycosidic linkages, for example. Still in some aspects, a dextran long chain can comprise 100% alpha-1,6-glycosidic linkages (excepting the linkage used by such long chain to branch from another chain).

Short chains of a dextran molecule in some aspects are one to three glucose monomers in length and comprise less than about 5-10% of all the glucose monomers of the dextran polymer. At least about 90%, 91%, 92%, 93%, 94%, 95%, 96%, 97%, 98%, 99%, or all of, short chains herein are 1-3 glucose monomers in length. The short chains of a dextran molecule can comprise less than about 10%, 9%, 8%, 7%, 6%, 5%, 4%, 3%, 2%, or 1% of all the glucose monomers of the dextran molecule, for example.

Short chains of a dextran molecule in some aspects can comprise alpha-1,2-, alpha-1,3-, and/or alpha-1,4-glycosidic linkages. Short chains, when considered all together (not individually) may comprise (i) all three of these linkages, or (ii) alpha-1,3- and alpha-1,4-glycosidic linkages, for example. It is believed that short chains of a dextran molecule herein can be heterogeneous (i.e., showing some variation in linkage profile) or homogeneous (i.e., sharing similar or same linkage profile) with respect to the other short chains of the dextran.

Dextran in certain embodiments can have a weight average molecular weight (Mw) of about, or at least about, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 million (or any integer between 50 and 200 million) (or any range between two of these values). The Mw of dextran can be about 50-200, 60-200, 70-200, 80-200, 90-200, 100-200, 110-200, 120-200, 50-180, 60-180, 70-180, 80-180, 90-180, 100-180, 110-180, 120-180, 50-160, 60-160, 70-160, 80-160, 90-160, 100-160, 110-160, 120-160, 50-140, 60-140, 70-140, 80-140, 90-140, 100-140, 110-140, 120-140, 50-120, 60-120, 70-120, 80-120, 90-120, 100-120, 110-120, 50-110, 60-110, 70-110, 80-110, 90-110, 100-110, 50-100, 60-100, 70-100, 80-100, 90-100, or 95-105 million, for example. Any of these Mw's can be represented in weight average degree of polymerization (DPw), if desired, by dividing Mw by 162.14.

The z-average radius of gyration of a dextran herein can be about 200-280 nm. For example, the z-average Rg can be about 200, 205, 210, 215, 220, 225, 230, 235, 240, 245, 250, 255, 260, 265, 270, 275, or 280 nm (or any integer between 200-280 nm). As other examples, the z-average Rg can be about 200-280, 200-270, 200-260, 200-250, 200-240, 200-230, 220-280, 220-270, 220-260, 220-250, 220-240, 220-230, 230-280, 230-270, 230-260, 230-250, 230-240, 240-280, 240-270, 240-260, 240-250, 250-280, 250-270, or 250-260 nm.

In another embodiment, the polysaccharide comprises a composition comprising a poly alpha-1,3-glucan ester compound represented by Structure I:

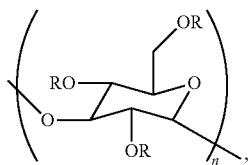

Structure I wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the ester compound has a degree of substitution with the first group of about 0.001 to about 0.1.

Such poly alpha-1,3-glucan esters and their preparation are disclosed in published patent application WO 2017/003808, the disclosure of which is incorporated herein in its entirety. In some embodiments, poly alpha-1,3-glucan ester compounds represented by Structure I and having a degree of substitution with the first group of about 0.001 to about 3 may be useful in rubber compositions.

The terms "poly alpha-1,3-glucan ester compound", "poly alpha-1,3-glucan ester", "poly alpha-1,3-glucan ester derivative", "glucan ester" are used interchangeably herein.

A poly alpha-1,3-glucan ester compound of Structure I is termed an "ester" herein by virtue of comprising the substructure —$C_G$—O—CO—$C_x$, where "—$C_G$—" represents carbon 2, 4, or 6 of a glucose monomeric unit of a poly alpha-1,3-glucan ester compound, and where "—CO—$C_x$" is comprised in the first group.

A "first group" herein comprises —CO—$C_x$—COOH. The term "—$C_x$—" refers to a portion of the first group that typically comprises a chain of 2 to 6 carbon atoms, each carbon atom preferably having four covalent bonds.

The terms "poly alpha-1,3-glucan monoester" and "monoester" are used interchangeably herein. A poly alpha-1,3-glucan monoester contains one type of first group.

The terms "poly alpha-1,3-glucan mixed ester" and "mixed ester" are used interchangeably herein. A poly alpha-1,3-glucan mixed ester contains two or more types of a first group.

The terms "reaction", "esterification reaction", "reaction composition", "reaction preparation" and the like are used interchangeably herein and refer to a reaction comprising, or consisting of, poly alpha-1,3-glucan and at least one cyclic organic anhydride. A reaction is placed under suitable conditions (e.g., time, temperature, pH) for esterification of one or more hydroxyl groups of the glucose units of poly alpha-1,3-glucan with a first group provided by the cyclic organic anhydride, thereby yielding a poly alpha-1,3-glucan ester compound.

The terms "cyclic organic anhydride", "cyclic organic acid anhydride", and "cyclic acid anhydride" are used interchangeably herein. A cyclic organic anhydride herein can have a formula represented by Structure II shown below:

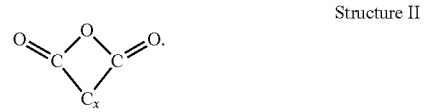

Structure II

The —$C_x$— portion of Structure II typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

Each R group in the formula of a poly alpha-1,3-glucan ester compound represented by Structure I can independently be an —H or a first group comprising —CO—$C_x$—COOH. The —$C_x$— portion of the first group typically comprise a chain of 2 to 6 carbon atoms; each of these carbon atoms is preferably involved in four covalent bonds. In general, each carbon in the chain, aside from being covalently bonded with an adjacent carbon atom(s) in the chain or a carbon atom of the flanking C=O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH=CH—), and/or be bonded to a hydrogen and an organic group (i.e., one hydrogen is substituted with an organic group). Skilled artisans would understand how the carbon atoms of the —$C_x$— portion of a first group comprising —CO—$C_x$—COOH can typically be bonded, given that carbon has a valency of four. It is contemplated that, in some embodiments, the —$C_x$-portion of the first group can comprise a chain of 2 to 16, 2 to 17, or 2 to 18 carbon atoms.

In certain embodiments, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH. These first groups can be derived, respectively, by reacting succinic anhydride, glutaric anhydride, adipic anhydride, pimelic anhydride, or suberic anhydride with poly alpha-1,3-glucan.

The —$C_x$— portion of the first group (—CO—$C_x$—COOH) in some aspects can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH═CH—COOH, —CO—CH═CH—CH$_2$—COOH, —CO—CH═CH—CH$_2$—CH$_2$—COOH, —CO—CH═CH—CH$_2$—CH$_2$—CH$_2$—COOH, —CO—CH═CH—CH$_2$—CH$_2$—CH$_2$—CH$_2$—COOH, —CO—CH$_2$—CH═CH—COOH, —CO—CH$_2$—CH═CH—CH$_2$—COOH, —CO—CH$_2$—CH═CH—CH$_2$—CH$_2$—COOH, —CO—CH$_2$—CH═CH—CH$_2$—CH$_2$—CH$_2$—COOH, —CO—CH$_2$—CH$_2$—CH═CH—COOH, —CO—CH$_2$—CH$_2$—CH═CH—CH$_2$—COOH, —CO—CH$_2$—CH$_2$—CH═CH—CH$_2$—CH$_2$—COOH, —CO—CH$_2$—CH$_2$—CH$_2$—CH═CH—COOH, —CO—CH$_2$—CH$_2$—CH$_2$—CH═CH—CH$_2$—COOH, and —CO—CH$_2$—CH$_2$—CH$_2$—CH$_2$—CH═CH—COOH. Each of these first groups can be derived by reacting the appropriate cyclic organic anhydride with poly alpha-1,3-glucan. For example, to produce a first group comprising —CO—CH═CH—COOH, maleic anhydride can be reacted with poly alpha-1,3-glucan. Thus, a cyclic organic anhydride comprising a —$C_x$— portion represented in any of the above-listed first groups (where the corresponding —$C_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—$C_x$—COOH).

The —$C_x$— portion of the first group (—CO—$C_x$—COOH) in some aspects herein can comprise at least one branch comprising an organic group. Examples of a first group in which the —$C_x$— portion comprises at least one organic group branch include:

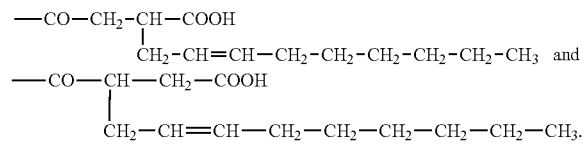

Each of these two first groups can be derived by reacting 2-nonen-1-yl succinic anhydride with poly alpha-1,3-glucan. It can be seen that the organic group branch (generically termed "$R^b$" herein) in both these examples is —CH$_2$—CH═CH—CH$_2$—CH$_2$—CH$_2$—CH$_2$—CH$_2$—CH$_3$. It can also be seen that the $R^b$ group substitutes for a hydrogen in the —$C_x$— carbon chain.

Thus, for example, a first group (—CO—$C_x$—COOH) herein can be any of —CO—CH$_2$—CH$_2$—COOH, —CO—CH$_2$—CH$_2$—CH$_2$—COOH, —CO—CH$_2$—CH$_2$—CH$_2$—CH$_2$—COOH, —CO—CH$_2$—CH$_2$—CH$_2$—CH$_2$—CH$_2$—COOH, or —CO—CH$_2$—CH$_2$—CH$_2$—CH$_2$—CH$_2$—CH$_2$—COOH, but in which at least one, two, three, or more hydrogens thereof is/are substituted with an $R^b$ group. Also for example, a first group (—CO—$C_x$—COOH) herein can be any of —CO—CH═CH—CH$_2$—COOH, —CO—CH═CH—CH$_2$—CH$_2$—COOH, —CO—CH═CH—CH$_2$—CH$_2$—CH$_2$—COOH, —CO—CH═CH—CH$_2$—CH$_2$—CH$_2$—CH$_2$—COOH, —CO—CH$_2$—CH═CH—CH$_2$—COOH, —CO—CH$_2$—CH═CH—CH$_2$—CH$_2$—COOH, —CO—CH$_2$—CH═CH—CH$_2$—CH$_2$—CH$_2$—COOH, —CO—CH$_2$—CH$_2$—CH═CH—COOH, —CO—CH$_2$—CH$_2$—CH═CH—CH$_2$—COOH, —CO—CH$_2$—CH$_2$—CH═CH—CH$_2$—CH$_2$—COOH, —CO—CH$_2$—CH$_2$—CH$_2$—CH═CH—COOH, —CO—CH$_2$—CH$_2$—CH$_2$—CH═CH—CH$_2$—COOH, or —CO—CH$_2$—CH$_2$—CH$_2$—CH$_2$—CH═CH—COOH, but in which at least one, two, three, or more hydrogens thereof is/are substituted with an $R^b$ group (such first groups are examples in which the —$C_x$— portion comprises at least one double-bond in the carbon atom chain and at least one branch comprising an organic group). Suitable examples of $R^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure II and its involvement in the esterification process to prepare poly alpha-1,3-glucan esters of Structure I herein as disclosed in WO 2017/003808, what particular cyclic organic anhydride is suitable for deriving any of these first groups.

Examples of cyclic organic anhydrides by name that can be included in a reaction with poly alpha-1,3-glucan to form a poly alpha-1,3-glucan ester compound represented by Structure I include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, and 2-octen-1-yl succinic anhydride. Alkenyl succinic anhydrides and alkylketene dimers, for example those derived from palmitic acid or other long chain carboxylic acids, can also be used. In particular, for example, maleic anhydride can be used to esterify —CO—CH═CH—COOH as a first group to poly alpha-1,3-glucan; methylsuccinic anhydride can be used to esterify —CO—CH$_2$—CH(CH)—COOH and/or —CO—CH(CH)—CH$_2$—COOH as a first group to poly alpha-1,3-glucan; methylmaleic anhydride can be used to esterify —CO—CH═C(CH$_3$)—COOH and/or —CO—C(CH$_3$)═CH—COOH as a first group to poly alpha-1,3-glucan; dimethylmaleic anhydride can be used to esterify —CO—C(CH$_3$)═C(CH$_3$)—COOH as a first group to poly alpha-1,3-glucan; 2-ethyl-3-methylmaleic anhydride can be used to esterify —CO—C(CH$_2$CH$_3$)═C(CH$_3$)—COOH and/or —CO—C(CH$_3$)═C(CH$_2$CH$_3$)—COOH as a first group to poly alpha-1,3-glucan; 2-hexyl-3-methylmaleic anhydride can be used to esterify —CO—C(CH$_2$CH$_2$CH$_2$CH$_2$CH$_2$CH$_3$)═C(CH$_3$)—COOH and/or —CO—C(CH$_3$)═C(CH$_2$CH$_2$CH$_2$CH$_2$CH$_2$CH$_3$)—COOH as a first group to poly alpha-1,3-glucan; itaconic anhydride can be used to esterify —CO—CH$_2$—C(CH$_2$)—COOH and/or —CO—C(CH$_2$)—CH$_2$—COOH as a first group to poly alpha-1,3-glucan; 2-nonen-1-yl succinic anhydride can be used to esterify —CO—CH$_2$—CH(CH$_2$CH═CHCH$_2$CH$_2$CH$_2$CH$_2$CH$_3$)—COOH and/or —CO—CH(CH$_2$CH═CHCH$_2$CH$_2$CH$_2$CH$_2$CH$_3$)—CH$_2$—COOH as a first group to poly alpha-1,3-glucan.

As disclosed in WO 2017/003808, each of these first groups comprising a —$C_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylsuccinic anhydride to ester-derivatize poly alpha-1,3-glucan, where the resultant first group is —CO—CH$_2$—CH(CH$_3$)—COOH or —CO—CH(CH$_3$)—CH$_2$—COOH. Still another illustrative example includes using methylmaleic anhydride to ester-derivatize poly alpha-1,3-glucan, where the resultant first group is —CO—CH=C(CH$_3$)—COOH or —CO—C(CH$_3$)=CH—COOH. Still another illustrative example includes using itaconic anhydride (2-methylenesuccinic anhydride) to ester-derivatize poly alpha-1,3-glucan, where the resultant first group is —CO—CH$_2$—C(CH$_2$)—COOH or —CO—C(CH$_2$)—CH$_2$—COOH. Thus, a cyclic organic anhydride comprising a —C$_x$—portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Poly alpha-1,3-glucan ester compounds in certain embodiments can contain one type of a first group comprising —CO—C$_x$—COOH. For example, one or more R groups ester-linked to the glucose group in the above formula may be —CO—CH$_2$—CH$_2$—COOH; the R groups in this particular example would thus independently be hydrogen and —CO—CH$_2$—CH$_2$—COOH groups (such an ester compound can be referred to as poly alpha-1,3-glucan succinate). As another example, one or more R groups ester-linked to the glucose group in the above formula may be —CO—CH=CH—COOH; the R groups in this particular example would thus independently be hydrogen and —CO—CH=CH—COOH groups (such an ester compound can be referred to as poly alpha-1,3-glucan maleate).

Alternatively, poly alpha-1,3-glucan ester compounds can contain two or more different types of a first group comprising —CO—C$_x$—COOH (i.e., they can be mixed esters). Examples of such poly alpha-1,3-glucan mixed ester compounds can contain —CO—CH$_2$—CH$_2$—COOH and —CO—CH=CH—COOH as first groups (such an ester compound can be referred to as poly alpha-1,3-glucan succinate maleate). Other examples of such compounds contain both of the following first groups:

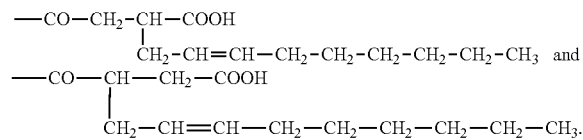

These two first groups can be derived by reacting a single cyclic organic anhydride (2-nonen-1-yl succinic anhydride) with poly alpha-1,3-glucan. Thus, it would be understood that certain cyclic organic anhydrides, when used to ester-derivatize poly alpha-1,3-glucan, can yield two different esterified first groups, since there are two ways, structurally speaking, in which the cyclic anhydride can react with glucan hydroxyl groups.

One, two, three, or more cyclic organic anhydrides can be used in an esterification reaction, if desired, to provide a mixture of poly alpha-1,3-glucan esters of Structure I. The amount of cyclic organic anhydride(s) in an esterification reaction can be selected to provide a composition comprising a poly alpha-1,3-glucan ester compound(s) having the desired degree of substitution with the first group(s).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

In one embodiment, a poly alpha-1,3-glucan ester compound represented by Structure I as disclosed herein comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof. In another embodiment, the poly alpha-1,3-glucan ester compound represented by Structure I comprises poly alpha-1,3-glucan succinate.

A poly alpha-1,3-glucan ester compound represented by Structure I can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the $DP_w$ (weight average degree of polymerization) or $DP_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

The term "degree of substitution" (DoS) as used herein refers to the average number of hydroxyl groups substituted in each monomeric unit (glucose) of a poly alpha-1,3-glucan ester compound. Poly alpha-1,3-glucan ester compounds useful in the rubber compositions disclosed herein have a degree of substitution (DoS) with one or more first groups (—CO—$C_x$—COOH) of about 0.001 to about 0.1. Alternatively, the DoS of a poly alpha-1,3-glucan ester compound can be about 0.001 to about 0.02, 0.025, 0.03, 0.035, 0.04, 0.05, 0.06, 0.07, 0.08, 0.09, or 0.1, for example. Alternatively still, it is believed that the DoS can be about 0.001 to about 1, or about 0.001 to about 1.5, or about 0.001 to about 2, or about 0.001 to about 2.5, or about 0.001 to about 3, for example. The DoS can optionally be expressed as a range between any two of these values. It would be understood by those skilled in the art that, since a poly alpha-1,3-glucan ester compound herein has a degree of substitution between about 0.001 to about 3, the R groups of the compound cannot only be hydrogen. The structure, molecular weight, and DoS of a poly alpha-1,3-glucan ester product can be confirmed using various physiochemical analyses known in the art such as NMR spectroscopy and size exclusion chromatography (SEC).

Additionally, it is believed that a poly alpha-1,3-glucan ester compound as represented by Structure III:

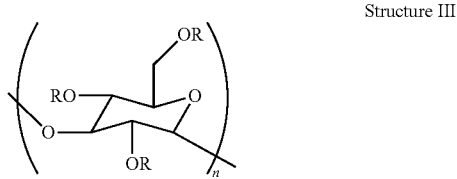

Structure III wherein
(A) n can be at least 6;
(B) each R can independently be a hydrogen atom (H) or an acyl group; and
(C) the ester compound has a degree of substitution of about 0.05 to about 3.0 may also be useful in preparing rubber compositions as disclosed herein. Poly alpha-1,3-glucan ester compounds of Structure III can be prepared by contacting poly alpha-1,3-glucan in a reaction that is substantially anhydrous with at least one acid catalyst, at least one acid anhydride, and at least one organic acid, as disclosed in U.S. Pat. No. 9,278,988, which is incorporated herein by reference in its entirety. An acyl group derived from the acid anhydride is esterified to the poly alpha-1,3-glucan in this contacting step, thereby producing a poly alpha-1,3-glucan ester compound.

In one embodiment, the polysaccharide comprises water-insoluble cellulose having a weight-average degree of polymerization ($DP_w$) of about 10 to about 1000 and a cellulose II crystal structure. Such cellulose, and methods for its preparation using a cellodextrin phosphorylase enzyme, are disclosed in published patent application WO 2016/106011, the disclosure of which is hereby incorporated in its entirety. As disclosed in WO 2016/106011, cellulose is produced by a cellodextrin phosphorylase enzyme directly as cellulose II. In contrast, cellulose produced in nature (e.g., in plants) typically is of a cellulose I structure and generally requires mercerization and/or other chemical treatments (e.g., derivatization followed by un-derivatization, formation of regenerated cellulose) to convert it into cellulose II. The dominant hydrogen bonds characterizing a cellulose II structure are O2-H—O6, O6-H—O6 and O2-H—O2, whereas cellulose I has O2-H—O6 as a dominant hydrogen bond. The structure of cellulose II comprises chain folding and is difficult to unravel. Cellulose II comprises anti-parallel chains, whereas in contrast, cellulose I chains are parallel.

It is surprising that cellulose having a cellulose II crystal structure and such a low molecular weight as about 10 to about 1000 weight-average degree of polymerization (DPw) is suitable for use in rubber compositions comprising polysaccharides (see Example 9 herein below). Such cellulose is not considered to have a fibrous structure and is different from the cellulose produced in nature, as in plants.

Cellodextrin phosphorylase enzymes as disclosed in published patent application WO 2016/106011 can synthesize low molecular weight cellulose that is insoluble in aqueous compositions. For example, a cellodextrin phosphorylase as employed in an enzymatic reaction as disclosed in WO 2016/106011 can produce low molecular weight, insoluble cellulose.

Cellulose produced by a cellodextrin phosphorylase enzyme in certain embodiments can have a $DP_w$ or $DP_n$ of about 10-1000. For example, $DP_w$ or $DP_n$ of the cellulose can be about 10-500, 10-250, 10-100, 10-75, 10-50, 10-45, 10-40, 10-35, 10-30, 10-25, 15-50, 15-45, 15-40, 15-35, 15-30, or 15-25. $DP_w$ or $DP_n$ of cellulose in some aspects can be about, at least about, or less than about, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Cellulose produced by a cellodextrin phosphorylase enzyme in some aspects can have an $M_w$ of about 1700-170000, 1700-86000, 1700-43000, 1700-17000, 1700-13000, 1700-8500, 1700-6800, 1700-5100, 2550-5100, or 2550-4250. $M_w$ can be about, at least about, or less than about, 1700, 1900, 2100, 2300, 2500, 2700, 2900, 3100, 3300, 3500, 3700, 3900, 4100, 4300, 4500, 4700, 4900, or 5100 in some aspects.

About 100% of the glycosidic linkages of cellulose produced by a cellodextrin phosphorylase enzyme as disclosed in WO 2016/106011 are beta-1,4 linkages. Cellulose in other aspects can have a glycosidic linkage profile of at least about 90%, 91%, 92%, 93%, 94%, 95%, 96%, 97%, 98%, or 99% beta-1,4 linkages. Accordingly, cellulose enzymatically produced can have, for example, less than 10%, 9%, 8%, 7%, 6%, 5%, 4%, 3%, 2%, or 1% of glycosidic linkages that are other than beta-1,4.

The backbone of a cellulose synthesized by cellodextrin phosphorylase enzyme can be linear/unbranched. Alternatively, there can be branches in the cellulose. Thus, in certain embodiments, cellulose can have no branch points or less than about 5%, 4%, 3%, 2%, or 1% branch points as a percent of the glycosidic linkages in the polymer.

Cellulose produced by a cellodextrin phosphorylase enzyme can have a cellulose II crystal structure. For example, enzymatically-produced cellulose can comprise about 100% cellulose, by weight, that is of a cellulose II crystal structure. As other examples, enzymatically-produced cellulose can comprise at least about 80%, 81%, 82%, 83%, 84%, 85%, 86%, 87%, 88%, 89%, 90%, 91%, 92%, 93%, 94%, 95%, 96%, 97%, 98%, or 99% cellulose, by weight, that is of a cellulose II crystal structure. Enzymatically-produced cellulose in some aspects can comprise less than about 20%, 19%, 18%, 17%, 16%, 15%, 14%, 13%, 12%, 11%, 10%, 9%, 8%, 7%, 6%, 5%, 4%, 3%, 2%, or 1% cellulose material, by weight, that is of a cellulose I, III, and/or IV crystal structure. Cellulose II crystal structure has been described by Kolpak and Blackwell (*Macromolecules* 9:273-278) and Kroon-Batenburg and Kroon (*Glycoconjugate J.* 14:677-690), for example, both of which are incorporated herein by reference. The dominant hydrogen bonds characterizing a cellulose II structure are O2-H—O6, O6-H—O6 and O2-H—O2, whereas cellulose I has O2-H—O6 as a dominant hydrogen bond. The structure of cellulose II comprises chain folding and is difficult to unravel.

Cellulose is produced by a cellodextrin phosphorylase enzyme, as disclosed in WO 2016/106011, directly as cellulose II. In contrast, cellulose produced in nature (e.g., in plants) typically is of a cellulose I structure and generally requires mercerization and/or other chemical treatments (e.g., derivatization followed by un-derivatization, formation of regenerated cellulose) to convert it into cellulose II. Enzymatically-produced cellulose in certain embodiments is in the cellulose II crystal state under both aqueous and dry conditions.

Cellulose produced as disclosed in WO 2016/106011 is insoluble in aqueous solvents such as water. However, it can be soluble in solvents comprising dimethyl sulfoxide (DMSO) and/or N,N-dimethylacetamide (DMAc). Examples of such solvents include DMSO or DMAc alone or further comprising lithium chloride (LiCl) (e.g., DMSO/LiCl and DMAc/LiCl). A DMSO/LiCl solvent or DMSO/LiCl solvent herein can comprise about 0.5, 1, 2, 3, 4, 5, 6, 7, 8, 9, or 10 wt % LiCl, for example, or can be LiCl-saturated. The concentration of enzymatically-produced cellulose can be at about 0.1-30 wt %, 0.1-20 wt %, 0.1-10 wt %, or 0.1-5 wt %, for example, or can be at about, or at least about, 0.1, 0.3, 0.5, 1, 2, 3, 4, 5, 6, 7, 8, 9, 10, 15, 20, 25, or 30 wt % in a non-aqueous solvent such as one comprising DMSO and/or DMAc. DMSO- and DMAc-comprising solvents herein do not further comprise an acid in certain aspects. Cellulose can be dissolved in any of the foregoing DMSO- and DMAc-based solvents at a relatively low temperature, such as at 15-30° C., 20-30° C., or 20-25° C. (e.g., room temperature), for example.

Compositions comprising cellulose as disclosed in WO 2016/106011 are not believed to occur in nature, and can optionally be characterized as having a flake or flake-like shape at nanometer scale. Flake or flake-like shapes formed by the cellulose have nano-size dimensions; such shapes can appear as flat, thin pieces of material when using appropriate microscopic techniques such as disclosed in WO 2016/106011. In other aspects, such cellulose is not, nor has been, derivatized. Thus, the cellulose does not comprise added functional groups such as ether groups (e.g., carboxymethyl groups) or ester groups (e.g., acetate groups).

Enzymatically-produced cellulose can be produced by a method comprising:
a) contacting at least water, glucose-1-phosphate (G1P), cellodextrin, and a cellodextrin phosphorylase enzyme comprising an amino acid sequence that is at least 90% identical to SEQ ID NO:2 or SEQ ID NO:6, as disclosed in WO 2016/106011, wherein insoluble cellulose is produced; and
b) optionally, isolating the cellulose produced in step (a).

The contacting step can optionally be characterized as providing an enzymatic reaction comprising water, glucose-1-phosphate, cellodextrin, and a cellodextrin phosphorylase enzyme as disclosed. The contacting step in a cellulose production method can be performed in any number of ways. For example, the desired amount of G1P and/or cellodextrin (e.g., cellobiose) can first be dissolved in water (optionally, other components may also be added at this stage of preparation, such as buffer components), followed by addition of one or more cellodextrin phosphorylase enzymes. The reaction may be kept still, or agitated via stirring or orbital shaking, for example. The reaction can be, and typically is, cell-free.

Glucose-1-phosphate (G1P) provided in a contacting step of a cellulose production method can be providing directly via addition of isolated G1P (e.g., G1P obtained from a commercial source), for example. Alternatively, G1P can be provided in the contacting step by providing at least a second reaction, wherein the products of the second reaction comprise G1P (i.e., the second reaction produces G1P as a product). A "second reaction" refers to a reaction that is in addition to the cellodextrin phosphorylase reaction performed in the contacting step (can optionally be denoted as a "first reaction"), and which provides G1P substrate for the cellodextrin phosphorylase reaction. A second reaction can optionally be characterized as employing a "G1P-producing enzyme" such as a starch phosphorylase, sucrose phosphorylase, or cellodextrin phosphorylase (when catalyzing cellulose hydrolysis).

Examples of cellodextrin suitable for use in an enzymatic reaction as disclosed in WO 2016/106011 include cellobiose (DP2), cellotiose (DP3), cellotetraose (DP4), cellopentaose (DP5), and cellohexaose (DP6). Cellobiose is used as a cellodextrin in certain aspects. Other examples of suitable cellodextrin include glucose polymers of 7 or more beta-1,4-linked glucose monomers resulting from the breakdown (e.g., enzymatic breakdown) of cellulose. One or more (e.g., a mixture of 2, 3, 4 or more) of the above types of cellodextrin can be employed in some embodiments.

Cellulose of a composition as presently disclosed herein can be a product of a cellodextrin phosphorylase enzyme comprising, or consisting of, an amino acid sequence that is at least 90% identical to SEQ ID NO:2 or SEQ ID NO:6 as disclosed in WO 2016/106011. In other embodiments, cellulose can be a product of a cellodextrin phosphorylase enzyme that comprises, or consists of, an amino acid sequence that is 100% identical to, or at least 90%, 91%, 92%, 93%, 94%, 95%, 96%, 97%, 98%, or 99% identical to, SEQ ID NO:2 or SEQ ID NO:6. Non-limiting examples of a cellodextrin phosphorylase enzyme comprising SEQ ID NO:2 include cellodextrin phosphorylase enzymes comprising, or consisting of, an amino acid sequence that is 100% identical to, or at least 90%, 91%, 92%, 93%, 94%, 95%, 96%, 97%, 98%, or 99% identical to, SEQ ID NO:4 as disclosed in WO 2016/106011. Non-limiting examples of a cellodextrin phosphorylase enzyme comprising SEQ ID NO:6 include cellodextrin phosphorylase enzymes comprising, or consisting of, an amino acid sequence that is 100% identical to, or at least 90%, 91%, 92%, 93%, 94%, 95%, 96%, 97%, 98%, or 99% identical to, SEQ ID NO:8 as disclosed in WO 2016/106011. A variant cellodextrin phosphorylase enzyme (e.g., between 90-99% amino acid identity with SEQ ID NO:2, 4, 6, or 8 reference sequence) should have some of (e.g., at least 30%, 40%, 50%, 60%, 70%, 80%, or 90% of), or all of, the enzymatic activity of the corresponding non-variant reference sequence.

In a further embodiment, the polysaccharide comprises an enzymatically-produced polysaccharide. Examples of enzymatically-produced polysaccharide include poly alpha-1,3-glucan; poly alpha-1,3-1,6-glucan; water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000; dextran; and enzymatically-produced water-insoluble cellulose having a weight average degree of polymerization (DPw) of about 10 to about 1000 and a cellulose II crystal structure. Enzymatic methods for the production of poly alpha-1,3-glucan are described in U.S. Pat. Nos. 7,000,000; 8,642,757; and 9,080,195, for example. Enzymatic production of poly alpha-1,3-1,6-glucan is disclosed in United States Patent Application Publication 2015/0232785 A1. The dextran polymer can be produced via an enzymatic process using glucosyltransferase enzyme comprising an amino acid sequence that is described in United States Patent Application Publication 2016/0122445 A1. Enzymatically produced low molecular weight, water insoluble cellulose having a cellulose II crystal structure can be prepared as disclosed in published patent application WO 2016/196022.

In an additional embodiment, the polysaccharide comprises alpha-1,3-glycosidic linkages, and the percentage of glycosidic linkages between the glucose monomer units that are alpha-1,3 is greater than or equal to 50%, 60%, 70%, 80%, 90%, 95%, 96%, 97%, 98%, 99%, or 100% (or any integer value between 50% and 100%).

In one embodiment, the polysaccharide can be used in the form of a colloidal dispersion, which can be prepared as disclosed in published patent application WO 2016/126685, the disclosure of which is incorporated herein by reference in its entirety. In another embodiment, the polysaccharide can be used in the form of a wet cake, for example containing greater than 5% by weight of water. In yet another embodiment, the polysaccharide can be used as a dry powder. In another embodiment, the polysaccharide can be used in the form of fibrids, which can be prepared as disclosed in published patent application WO 2016/196022, the disclosure of which is incorporated herein by reference in its entirety.

The term "fibrids", as used herein, means nongranular, fibrous or film-like particles with at least one of their three dimensions being of minor magnitude relative to the largest dimension. In some embodiments, the poly alpha-1,3-glucan or other polysaccharide can have a fiber-like and/or a sheet-like structure with a relatively large surface area when compared to a fiber. The surface area can be in the range of 5 to 50 meter$^2$/gram of material, with the largest dimension particle size of about 10 to 1000 micrometers and the smallest dimension size, length or thickness of 0.05 to 0.25 micrometers, resulting in an aspect ratio of largest to smallest dimension of 40 to 20,000. The terms "fibrids", "poly alpha-1,3-glucan fibrids" and "polysaccharide fibrids" are used interchangeably herein.

These fibrids can be prepared by precipitation of a solution of polymeric material such as poly alpha-1,3-glucan or other polysaccharide using a non-solvent under shear, preferably, high shear. The term "non-solvent" as used herein means that it is a poor solvent for the polymeric material, for example, the polymeric material has a solubility of less than 5 wt % in the solvent. In other embodiments, the polymeric material can have a solubility of less than 4, 3, 2, 1 or 0.5 wt % in the solvent. Examples of suitable non-solvents for the poly alpha-1,3-glucan or other polysaccharide include, for example, methanol, ethanol, isopropanol, acetone, aqueous acidic solution, water, etc.

Fibrids can be made by a process comprising:
(a) dissolving poly alpha-1,3-glucan or other polysaccharide in a solvent to make a poly alpha-1,3-glucan or other polysaccharide solution;
(b) precipitating poly alpha-1,3-glucan fibrids or other polysaccharide fibrids under shear to produce a suspension containing the fibrids.

Fibrids can also be made by the addition of a poly alpha-1,3-glucan solution or other polysaccharide solution into a precipitating bath of liquid ("non-solvent"). The addition of the poly alpha-1,3-glucan solution or other polysaccharide solution into the precipitating bath can be accomplished using any standards methods known to those skilled in the art. For example, direct injection can be used.

During the addition, the stream of polymer solution is subjected to shearing forces and turbulence causing the fibrids to precipitate in the form of a suspension by using a non-solvent (i.e., a liquid that has a solubility for the poly alpha-1,3-glucan or other saccharide of less than 5 wt %), in other words, that is immiscible with poly alpha-1,3-glucan or other saccharide. In some embodiments, the precipitating bath can comprise acid or alkali aqueous solution or alcohol.

It is possible to control (i) the viscosity of the suspension containing fibrids (ii) the size and/or (iii) the shape of the fibrids by controlling one or more process parameters such as, for example, the dope concentration, the type of solvent, the type of mixer, the mixing speed, the pH of precipitation bath, the rate of addition of the solution containing polymer, the amount of non-solvent used, the duration of mixing, the neutralization rate and the concentration of neutralizer.

The term "dope" as used herein refers to solution containing polymer. A dope can be prepared by mixing polymer into a solvent. Thus, as well known to those skilled in the art, dope concentration refers to the amount of polymer mixed into the solvent.

The fibrids can be isolated by filtering the suspension. Optionally, the isolated fibrids can be washed with water and/or dried. It is believed that it is possible to resuspend the dried fibrids either by adding a component such as carboxymethyl cellulose and the like or by functionalizing the fibrids by adding certain groups that would facilitate resuspension in a liquid.

Types of solvent for the poly alpha-1,3-glucan that can be used to practice the process include, but are not limited to, an aqueous basic solution containing components such as sodium hydroxide, potassium hydroxide, lithium hydroxide, lithium chloride/DMAC, DMSO/lithium chloride, etc. The solvent for the poly alpha-1,3-glucan or other polysaccharide should be miscible with the liquid used for the precipitation bath.

The mixing speed and the duration of mixing can be adjusted as desired.

The pH of the precipitation bath can be adjusted from acidic to neutral to basic depending upon the solvent chosen in which to mix the poly alpha-1,3-glucan or other polysaccharide.

The polysaccharides can be used in any useful amount, for example an amount sufficient to impart the desired properties to the rubber composition. As used herein, the rubber component is defined to be 100 parts per hundred (phr) of the rubber composition, and the amount of polysaccharide is conveniently cited as parts per hundred (phr), based on the weight fraction of the rubber component, as is typically done in the art when reciting the ingredients of a rubber composition. In one embodiment, the rubber composition comprises from about 5 to about 100 parts per hundred of polysaccharide, based on the weight fraction of the rubber component. In another embodiment, the rubber composition comprises at least 10 parts per hundred (phr) of the polysaccharide. In yet another embodiment, the rubber composition comprises an amount of polysaccharide that is 5, 10, 15, 20, 25, 30, 35, 40, 45, 50, 55, 60, 65, 70, 75, 80, 85, 90, 95, or 100 (or any value between 5 and 100) parts per hundred, based on the weight fraction of the rubber component.

The rubber compositions disclosed herein may optionally comprise a reinforcing filler in addition to the polysaccharide. In one embodiment, the rubber composition further comprises at least one of silica or carbon black. In one embodiment, the rubber composition further comprises silica. In one embodiment, the rubber composition further comprises carbon black.

Silica for the reinforcement of the rubber can be any suitable silica such as, for example, synthetic, precipitated silicas and fumed silica. Representative of such silicas, for example, are silicas from PPG Industries under the Hi-Sil trademark; silicas from Rhodia under the Zeosil trademark; silicas from Degussa AG with designations VN2 and VN3, and silicas from AKZO Chemie, etc. In one embodiment, the rubber composition comprises silica in an amount of from 0 to 20 phr (parts by weight per 100 parts by weight of the rubber component). In another embodiment, the rubber composition comprises silica in an amount of 1, 2, 3, 4, 5, 6, 7, 8, 9, 10, 11, 12, 13, 14, 15, 16, 17, 18, 19, or 20 phr. In yet another embodiment, the rubber composition comprises no silica.

The silica may be used alone as the only filler or, optionally, one or more other fillers may be used in combination with silica. In one embodiment, carbon black is used as filler and is compounded together with the silica. In another embodiment, the rubber composition comprises carbon black in an amount of from 0 to 100 phr. In another embodiment, the rubber composition comprises 1 phr, 2 phr, 3 phr, 4 phr, 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, or 100 phr of carbon black. In yet another embodiment, the rubber composition comprises no carbon black. In an additional embodiment, the rubber composition comprises a total amount of silica and carbon black in the range of 50 phr to 150 phr, for example from 50 phr to 75 phr, or from 50 phr to 100 phr, or from 50 phr to 125 phr, or from 75 phr to 100 phr, or from 75 phr to 125 phr, or from 75 phr to 150 phr, or from 125 phr to 150 phr. Other than silica and carbon black, fillers can include, for example, titanium oxide, aluminum silicate, clay, talc, or a combination thereof.

In an additional embodiment, the rubber composition further comprises at least one of a filler, an antioxidant, an antiozonant, a processing aid, a compatibilizer, a bonding agent, a tackifier, a curing agent, an accelerator, or a combination thereof.

In another embodiment, the rubber composition may optionally comprise a silane coupling agent. The silane coupling agent can help to bond the polysaccharide, or the polysaccharide and the silica, with the rubber component. Typically, the silane coupling agent comprises an organic silane compound having an organic moiety capable of reacting with a polymer, such as a sulfide, an amino group, a mercapto group, a vinyl group, a methacryl group, or an epoxy group, and a halogen, an alkoxy group or the like. Optional silane coupling agents include, for example, bis(3-triethoxysilylpropyl)tetrasulfide, bis(3-triethoxysilylpropyl)disulfide, bis(2-triethoxysilylethyl)tetrasulfide, 3-mercaptopropyl trimethoxysilane, 3-mercaptopropyl triethoxysilane, 3-nitropropyl trimethoxysilane and 3-aminopropyl triethoxysilane. The amount of silane coupling agent is typically in the range of 2 to 25 parts per hundred of the rubber polymer, more specifically 5 to 15 parts per hundred of the rubber polymer.

In an additional embodiment, the rubber composition further comprises a polyetheramine. Mixtures of two or more polyetheramines can also be used. Useful polyetheramines include monoamines, diamines, and triamines having polyether backbones. The polyether backbones can be based on, for example, ethylene oxide, propylene oxide, a mixture of ethylene oxide and propylene oxide, poly(tetramethylene ether glycol), or poly(tetramethylene ether glycol)/(polypropylene glycol) copolymers. The polyetheramines can have molecular weights in the range of from about 200 g/mole to about 5000 g/mole, or higher. Polyetheramines can be prepared by methods known in the art or obtained commercially, for example from the JEFFAMINE® product line from Huntsman.

In one embodiment, the rubber composition comprises a polyetheramine in an amount of from 0 to 30 parts per hundred (phr), based on the weight fraction of the rubber component. In another embodiment, the rubber composition comprises a polyetheramine in an amount of from 0 to 25 phr. In yet another embodiment, the rubber composition comprises 1 phr, 2 phr, 3 phr, 4 phr, 5 phr, 6 phr, 7 phr, 8 phr, 9 phr, 10 phr, 11 phr, 12 phr, 13 phr, 14 phr, 15 phr, 16 phr, 17 phr, 18 phr, 19 phr, 20 phr, 21 phr, 22 phr, 23 phr, 24 phr, 25 phr, 26 phr, 27 phr, 28 phr, 29 phr, or 30 phr (or any value between 0 and 30) of polyetheramine.

In one embodiment, the rubber composition further comprises a polyetheramine and a silane coupling agent. In another embodiment, the rubber composition further comprises a polyetheramine and is substantially free of a silane coupling agent.

The rubber composition can include various additives generally used in a rubber composition for a tire tread such as softeners, plasticizers, antioxidants, zinc white, fatty acid, vulcanizing agents, vulcanization accelerators and so forth.

In one embodiment, a rubber composition comprises a rubber component and a polysaccharide, wherein the rubber component comprises styrene butadiene copolymer rubber or hydrogenated nitrile butadiene rubber, and the polysaccharide comprises poly alpha-1,3-glucan. In another embodiment, the rubber component comprises styrene butadiene copolymer rubber or hydrogenated nitrile butadiene rubber, and the polysaccharide comprises poly alpha-1,3-1.6-glucan. In a further embodiment, the rubber component comprises styrene butadiene copolymer rubber or hydrogenated nitrile butadiene rubber, and the polysaccharide comprises dextran. In yet another embodiment, the rubber component comprises styrene butadiene copolymer rubber or hydrogenated nitrile butadiene rubber, and the polysaccharide comprises a poly alpha-1,3-glucan ester compound represented by Structure I

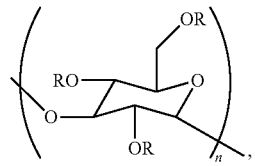

Structure I wherein n is at least 6, each R is independently an —H or a first group comprising —CO—C$_x$—COOH, wherein the —C$_x$— portion of said first group comprises a chain of 2 to 6 carbon atoms, and the ester compound has a degree of substitution with the first group of about 0.001 to about 0.1.

In yet a further embodiment, the rubber component comprises styrene butadiene copolymer rubber or hydrogenated nitrile butadiene rubber, and the polysaccharide comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof.

In one embodiment, a rubber composition comprises a rubber component and a polysaccharide, wherein the rubber component comprises natural rubber or synthetic polyisoprene, and the polysaccharide comprises poly alpha-1,3-glucan. In another embodiment, the rubber component comprises natural rubber or synthetic polyisoprene, and the polysaccharide comprises poly alpha-1,3-1.6-glucan. In a further embodiment, the rubber component comprises natural rubber or synthetic polyisoprene, and the polysaccharide comprises dextran. In yet another embodiment, the rubber component comprises natural rubber or synthetic polyisoprene, and the polysaccharide comprises a poly alpha-1,3-glucan ester compound represented by Structure I

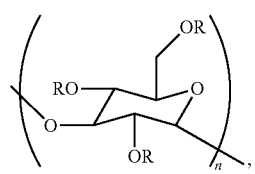

Structure I wherein n is at least 6, each R is independently an —H or a first group comprising —CO—$C_x$—COOH, wherein the —$C_x$— portion of said first group comprises a chain of 2 to 6 carbon atoms, and the ester compound has a degree of substitution with the first group of about 0.001 to about 0.1. In yet a further embodiment, the rubber component comprises natural rubber or synthetic polyisoprene and the polysaccharide comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof.

In one embodiment, a rubber composition comprises a rubber component and a polysaccharide, wherein the rubber component comprises ethylene propylene diene monomer rubber or polybutadiene, and the polysaccharide comprises poly alpha-1,3-glucan. In another embodiment, the rubber component comprises ethylene propylene diene monomer rubber or polybutadiene, and the polysaccharide comprises poly alpha-1,3-1.6-glucan. In a further embodiment, the rubber component comprises ethylene propylene diene monomer rubber or polybutadiene, and the polysaccharide comprises dextran. In yet another embodiment, the rubber component comprises ethylene propylene diene monomer rubber or polybutadiene, and the polysaccharide comprises a poly alpha-1,3-glucan ester compound represented by Structure I

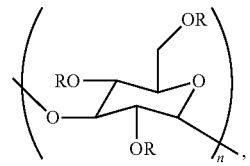

Structure I wherein n is at least 6, each R is independently an —H or a first group comprising —CO—$C_x$—COOH, wherein the —$C_x$— portion of said first group comprises a chain of 2 to 6 carbon atoms, and the ester compound has a degree of substitution with the first group of about 0.001 to about 0.1. In yet a further embodiment, the rubber component comprises ethylene propylene diene monomer rubber or polybutadiene and the polysaccharide comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof.

In one embodiment, a rubber composition comprises a rubber component and a polysaccharide, wherein the rubber component comprises silicone rubber or neoprene, and the polysaccharide comprises poly alpha-1,3-glucan. In another embodiment, the rubber component comprises silicone rubber or neoprene, and the polysaccharide comprises poly alpha-1,3-1.6-glucan. In a further embodiment, the rubber component comprises silicone rubber or neoprene, and the polysaccharide comprises dextran. In yet another embodiment, the rubber component comprises silicone rubber or neoprene, and the polysaccharide comprises a poly alpha-1,3-glucan ester compound represented by Structure I

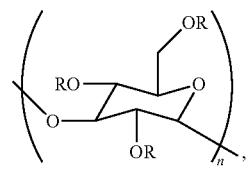

Structure I wherein n is at least 6, each R is independently an —H or a first group comprising —CO—$C_x$—COOH, wherein the —$C_x$— portion of said first group comprises a chain of 2 to 6 carbon atoms, and the ester compound has a degree of substitution with the first group of about 0.001 to about 0.1. In yet a further embodiment, the rubber component comprises silicone rubber or neoprene and the polysaccharide comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof.

It is readily understood by those having skill in the art that a rubber composition as disclosed herein can be compounded by methods generally known in the rubber compounding art. In one embodiment, rubber compositions comprising polysaccharides can be prepared by a method comprising the steps of:

a) forming a first mixture comprising a polysaccharide and a rubber component, wherein the first mixture is free of sulfur, accelerators, and curatives;

b) mixing the first mixture in at least one nonproductive stage at a temperature in the range of about 80° C. to about 180° C. to produce a second mixture;

c) adding sulfur, an accelerator, and/or a curative to the second mixture;

d) mixing the material obtained in step c) at a temperature in the range of about 80° C. to about 125° C.; and e) optionally, further homogenizing the material obtained in step d). Step a) forming a first mixture can be performed by combining the ingredients in any order. The ingredients can be added sequentially, in portions or all at once. Step b) mixing in at least one nonproductive stage can be performed at a temperature in the range of from about 80° C. to about 180° C., for example in the range of from about 80° C. to about 160° C. Step d), mixing the material obtained in step c) (which contains sulfur, an accelerator, and/or a curative) can be performed at a temperature in the range of from about 80° C. to about 125° C., for example in the range of from about 80° C. to about 115° C., or from about 85° C. to about 100° C. Concomitant with the mixing of step b) to produce a second mixture is a step of removing water, the water having been present with the polysaccharide used in step a), for example in polysaccharide wet cake, colloidal dispersion, or fibrids.

The rubber composition can be used as a rubber composition for applications such as a pneumatic tire, which can be formed by vulcanization molding according to conventional methods. The tires can be built, shaped, molded and cured by various methods which will be readily apparent to those having skill in such art. The rubber compositions can also be used to form other articles which are also generally vulcanized, including but not limited to tire treads, tire sidewalls, conveyor belts, power transmission belts, hoses, gaskets, and footwear. The rubber compositions disclosed herein can also be used as coatings, films, or adhesives. The use of the disclosed polysaccharides in rubber compositions can provide advantages such as lower cost, lower density, lower energy consumption during processing, and better performance, for example increased wet traction, reduced rolling resistance, and lighter weight when used in articles such as tires.

Non-limiting examples of the embodiments disclosed herein include:

1. A rubber composition comprising:
   a) a rubber component; and
   b) a polysaccharide;
   wherein the polysaccharide comprises:
   i) poly alpha-1,3-glucan;
   ii) poly alpha-1,3-1,6-glucan;
   iii) water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000;
   iv) dextran;
   v) a composition comprising a poly alpha-1,3-glucan ester compound represented by Structure I:

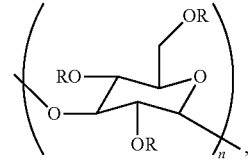

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 0.1; or vi) water-insoluble cellulose having a weight-average degree of polymerization (DPw) of about 10 to about 1000 and a cellulose II crystal structure.

2. The composition of embodiment 1, wherein the rubber component comprises at least one diene-based sulfur-vulcanizable elastomer having a Tg below −30° C., as determined by dynamic mechanical analysis.

3. The composition of embodiments 1 or 2, wherein the elastomer comprises natural rubber, synthetic polyisoprene, styrene butadiene copolymer rubber, ethylene propylene diene monomer rubber, hydrogenated nitrile butadiene rubber, polybutadiene, silicone rubber, or neoprene.

4. The composition of embodiments 1, 2, or 3 wherein the polysaccharide comprises particles having an average particle size in at least one dimension in the range of from about 5 nm to about 200 μm.

5. The composition of embodiments 1, 2, 3, or 4 wherein the polysaccharide comprises a polysaccharide characterized by a surface area in the range of from about 0.1 $m^2$/g to about 200 $m^2$/g, as determined by Brunauer-Emmett-Teller measurement method.

6. The composition of embodiments 1, 2, 3, 4, or 5 wherein the polysaccharide comprises poly alpha-1,3-glucan.

7. The composition of embodiments 1, 2, 3, 4, or 5 wherein the polysaccharide comprises poly alpha-1,3-1,6-glucan.

8. The composition of embodiments 1, 2, 3, 4, or 5 wherein the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

9. The composition of embodiments 1, 2, 3, 4, or 5 wherein the polysaccharide comprises dextran.

10. The composition of embodiments 1, 2, 3, 4, or 5 wherein the polysaccharide comprises a composition comprising a poly alpha-1,3-glucan ester compound represented by Structure I:

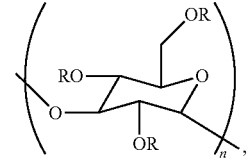

Structure I wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 0.1.

11. The composition of embodiments 1, 2, 3, 4, or 5 wherein the polysaccharide comprises water-insoluble cellulose having a weight-average degree of polymerization (DPw) of about 10 to about 1000 and a cellulose II crystal structure.

12. The composition of embodiments 1, 2, 3, 4, 5, or 10 wherein the poly alpha-1,3-glucan ester compound comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof.

13. The composition of embodiments 1, 2, 3, 4, 5, 6, 7, 8, 9, 10, 11, or 12 wherein the rubber composition comprises from about 5 to about 100 parts per hundred of polysaccharide, based on the weight fraction of the rubber component.

14. The composition of embodiments 1, 2, 3, 4, 5, 6, 7, 8, 9, 10, 11, 12, or 13 wherein the polysaccharide comprises an enzymatically-produced polysaccharide.

15. The composition of embodiments 1, 2, 3, 4, 5, 6, 7, 8, 9, 10, 11, 12, 13, or 14 wherein the composition further comprises at least one of carbon black or silica.

16. The composition of embodiments 1, 2, 3, 4, 5, 6, 7, 8, 9, 10, 11, 12, 13, 14, or 15 wherein the composition further comprises at least one of a filler, an antioxidant, an antiozonant, a processing aid, a compatibilizer, a bonding agent, a tackifier, a curing agent, an accelerator, a coupling agent, or a combination thereof.

17. The composition of embodiments 1, 2, 3, 4, 5, 6, 7, 8, 9, 10, 11, 12, 13, 14, 15, or 16 wherein the rubber component comprises styrene butadiene copolymer rubber or hydrogenated nitrile butadiene rubber, and the polysaccharide comprises poly alpha-1,3-glucan.

18. The composition of embodiments 1, 2, 3, 4, 5, 6, 7, 8, 9, 10, 11, 12, 13, 14, 15, 16, or 17 wherein the composition further comprises a polyetheramine.

19. An article comprising the rubber composition of embodiments 1, 2, 3, 4, 5, 6, 7, 8, 9, 10, 11, 12, 13, 14, 15, 16, 17, or 18.

20. The article of embodiment 19, wherein the article is a tire, a belt, a seal, footwear, a valve, tubing, a mat, a gasket, a coating, a film, or an adhesive.

21. A method for preparing a rubber composition comprising a polysaccharide, the method comprising the steps of:
a) forming a first mixture comprising a polysaccharide and a rubber component, wherein the first mixture is free of sulfur, accelerators, and curatives;
b) mixing the first mixture in at least one nonproductive stage and at a temperature in the range of about 80° C. to about 180° C. to produce a second mixture;
c) adding sulfur, an accelerator, and/or a curative to the second mixture;
d) mixing the material obtained in step c) at a temperature in the range of about in the range of about 80° C. to about 180° C.; and
e) optionally, further homogenizing the material obtained in step d).

22. The method of embodiment 21, wherein the rubber composition comprises a rubber composition of embodiment 1, 2, 3, 4, 5, 6, 7, 8, 9, 10, 11, 12, 13, 14, 15, 16, 17, or 18.

While certain representative embodiments and details have been shown for the purpose of illustration, it will be apparent to those skilled in this art that various changes and modifications may be made therein without departing from the spirit or scope of the invention.

EXAMPLES

Unless otherwise noted, all materials were used as received.

As used herein, "Comp. Ex." Means Comparative Example; "Ex." means Example.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Polysaccharide Samples

Three samples of enzyme-polymerized poly alpha-1,3-glucan were used to prepare rubber compositions. The first was dry poly alpha-1,3-glucan powder obtained via drying of wet cake in a vacuum oven followed by milling to provide particle size in the range of 30 to 100 μm (moisture content of 7%) referred to here as Polysaccharide A. Two samples of poly alpha-1,3-glucan, referred to here as Polysaccharide B and Polysaccharide C, respectively, were recovered as wet cakes from the downstream processing. Polysaccharide B had a moisture content of 64% as wet cake, and Polysaccharide C had a moisture content of 83% as wet cake. Each wet cake polysaccharide was then subjected (separately) to high shear mixing to form a colloidal dispersion, and used as described below to form rubber compositions.

The fourth polysaccharide sample was poly alpha-1,3-glucan succinate as a wet cake, referred to here as Polysaccharide D. The poly alpha-1,3-glucan succinate was prepared from enzyme-polymerized poly alpha-1,3-glucan as described herein below.

Preparation of Poly Alpha-1,3-Glucan Succinate (Polysaccharide D)

The poly alpha-1,3-glucan succinate was prepared according to the following procedure, using the specific amounts shown in Table 2 below. A jacketed reactor was loaded with water and 50% NaOH and the system was allowed to equilibrate to 60° C. Glucan wet cake was then added to the mixer and soon afterward, the succinic anhydride powder was added to the system. The reaction was then kept at a constant temperature of 60° C. for 1 hour. Once the reaction was completed, the system was filtered and washed with deionized water. After the first filtration (which removed ~3.5 kg of water), the solid material was re-slurred with 3 kg of water and filtered again to obtain Polysaccharide D as a wet cake.

TABLE 2

Materials Used in Synthesis of Polysaccharide D

| | |
|---|---|
| Glucan mass - dry (grams) | 1000.00 |
| Succinic anhydride (grams) | 37.06 |
| 50% NaOH in the system (grams) | 59.2 |
| Succinic anhydride (moles) | 0.37 |
| NaOH (moles) | 0.74 |
| Glucan wet cake mass (grams) | 2941.18 |
| Water added | 6034.11 |

The specific surface areas of the polysaccharides, as measured by Brunauer-Emmett-Teller (BET) technique, are shown in Table 3 along with their form, moisture content (as wet cake), and crystallinity. The polysaccharides were linear in molecular structure and water insoluble.

TABLE 3

Properties of Polysaccharides Used

| | Polysaccharide | | | |
|---|---|---|---|---|
| Property | A | B | C | D |
| Form | Dry powder | Colloidal dispersion | Colloidal dispersion | Wet cake |
| Moisture content (%) | 7 | 64* | 83* | 72.4* |
| BET Surface area ($m^2/g$) | 0.7 | 9.7 | 19.4 | 9.7 |
| Crystallinity | 65% | 65% | 65% | 65% |
| Zeta potential (mV) | 0 | 0 | 0 | −2.99 |

*of the polysaccharide wet cake

Methods

Moisture content of the polysaccharides was determined using an automatic moisture analyzer (Ohaus MB25 moisture analyzer) by weight difference.

The BET surface area of the polysaccharides was determined using the following procedure. Nitrogen adsorption/desorption measurements were performed at 77.3 K. on a Micromeritics ASAP model 2420 porosimeter. Samples were degassed at the above temperature for 12 h at <100 μm Hg prior to data collection. Surface area measurements utilized a five-point adsorption isotherm collected over 0.05 to 0.20 $P/P_0$ and analyzed via the BET method [S. Brunauer, P. H. Emmett and E. Teller, J. Amer. Chem. Soc., 60, 309(1938)]. Pore volume distributions utilized a multi-point desorption isotherm and were analyzed via the BJH method [E. P. Barrett, L. G. Joyner and P. P. Halenda, *J. Amer. Chem. Soc.*, 73, 373(1951).] P is the pressure of the gas above the sample (generally at liquid nitrogen BP temperature); Po is the saturation gas pressure at the temperature of the sample being measured (typically 760 Torr for nitrogen at 77.3 K).

The crystallinity of the polysaccharides was determined by wide angle x-ray scattering (WAXS) using the following procedures.

Glucan powder samples were dried for a minimum of two hours or overnight in a vacuum oven set at 60° C. Sometimes samples were dried over a weekend. Right before starting the diffraction scan, the sample was removed from the oven and transferred into a stainless steel holder with a well of about 1.5 cm wide by 4 cm long by 4 mm deep. The well was open at the side such that the powder could be poured in through the side, with a glass plate clipped onto the top of the holder. The powder was packed down several times throughout the filling process by hitting the opposite side of the holder against the table repeatedly. Finally, the holder was turned right-side-up, the glass plate was removed, and the holder was loaded into the diffractometer. The time from the opening of the oven to the start of the scan should be five minutes or less.

A PANalytical X'Pert MPD Powder Diffractometer in reflection mode was used to measure the X-ray diffraction pattern of the powders. The X-ray source was a Cu X-ray tube line source with an optical focusing mirror and a 1/16° narrowing slit. X-rays were detected with a 1D detector and an anti-scatter slit set at 1/8°. Data was collected in the range of 4 to 60 degrees of two-theta at 0.1 degrees per step. The scan took about 46 minutes in total.

The resulting X-ray pattern was then analyzed by subtracting a linear baseline from 7.2 to 30.5 degrees, subtracting the XRD pattern of a known amorphous glucan sample which had been scaled to fit the current data, and then fitting the remaining crystal peaks in that range with a series of Gaussian curves corresponding to known dehydrated glucan crystal reflections. The area corresponding to the crystal peaks was then divided by the total area under the baseline-subtracted curve to yield a crystallinity index.

The zeta potential of the polysaccharides was determined using the following procedure. Zeta potential was measured with a Brookhaven (Holtsville, NY) ZetaPALS electrophoretic instrument. A dilute sample was placed in a cuvette that had a pair of immersed platinum electrodes. An alternating electric potential was applied across the electrodes, and the motion of the particles was observed using a backscattered laser light and an auto correlation technique similar to dynamic light scattering. The electrophoretic mobility of particles was measured by phase sensitive detection, and this mobility was used to determine the zeta potential. Several cycles of measurement were taken over a period of 10-15 minutes per sample.

Procedure for Preparing Rubber Compositions

In the following Examples and Comparative Examples, rubber compositions were prepared by mixing the indicated ingredients in several sequential nonproductive stages (without the sulfur and associated accelerator(s) curatives together with antidegradants) to temperatures of about 160° C. in an internal rubber compounder. This was then followed by a final mixing stage at a lower temperature of about 95° C. that involved the addition of curatives and antidegradants. In all formulations that contained wet polysaccharide, the moisture was evaporated during these compounding steps. The compounded material was then further homogenized with a two roll mill to further improve the dispersion and reduce the aggregation of the polysaccharides in the rubber composites. Materials processed as such were used for processibility testing including dynamic mechanical properties, and cure behavior. The homogenized material was further vulcanized/cured in a carver press compression mold at a temperature of about 160° C. and press pressure of 25,000 lbs. Cure times were evaluated according to ASTM 6204 using an RPA-2000 (Alpha technologies) oscillating disc rheometer with a temperature range of 23° C. to 230° C., oscillation amplitude of 0.005 deg to 90 deg of arc, and oscillation frequency of 0.1 to 2000. Using the cure time obtained with this procedure, fresh sample was loaded in the RPA, cured and cooled in the rheometer without taking out. Then strain sweep was done with the cured rubber at 60° C. in the strain range 0.3 to 100, from low to high and high to low, at 1 Hz frequency to measure the storage modulus (G') and Tan Delta. Rubber samples were compression molded at 160° C. under 500 psi pressure for a time equal to t98+5 minutes for tensile properties and hardness measurements. Tensile properties were measured according to ASTM D 412

06a, Method A, Die C and Shore A hardness were measured according to ASTM D624 and ASTM D 2240-05, respectively.

TABLE 4

Test Protocols Used to Characterize Rubber Compositions

| Test type | Method | Instrument |
|---|---|---|
| Shore A hardness | ASTM D2240 | Mitutoyo Digital Durometer |
| Tensile properties<br>Tensile Strength at Break<br>Modulus<br>Elongation<br>Energy under Stress-Strain Curve | ASTM D412 | Instron (Model 4202) |
| Tear properties (Die C) | ASTM D624 | Instron (Model 4202) |
| Din Abrasion | ASTM D 5963 | DIN Abrasion Tester (Qualitest) |
| Rebound | ASTM D2632 | Rebound resilience test stand (Zwick 5109) |
| RPA<br>Min torque (S')<br>Tan δ (60° C.)<br>Cure time | ASTM 6204 | RPA-2000 (Alpha technologies) |
| MDR T90 (Cure Rate mm) | ASTM D 2084 | Moving Die Rheometer (Gibitra Instruments) |
| Density | ASTM D297 | Electronic densimeter |

Comparative Example A

Examples 1A and 1B

Replacing a Portion of Carbon Black with Polysaccharide in a Passenger Tire Tread Rubber Composition Strong interaction between fillers and the rubber polymer/elastomer matrices is important to impart the desired performance improvement and requires good dispersion of the fillers. Table 5 displays the formulations of Comparative Example A, Example 1A, and Example 1B. The formulation of Comparative Example A is a carbon black (CB) reinforced rubber formulation for passenger car tire tread application; it does not contain polysaccharides or silica. In the formulations of Example 1A and Example 1B, a portion of the carbon black of Comparative Example A was replaced with Polysaccharide A (Example 1A) or Polysaccharide B (Example 1B). No processing aid oil was used in the formulation of Example 1B.

TABLE 5

Rubber Compositions for Comparative Example A, Example 1A, and Example 1B

| Raw Materials | Comp. Ex. A (phr) | Example 1A (phr) | Example 1B (phr) |
|---|---|---|---|
| SBR [a, *] | 103.12 | 103.12 | 103.12 |
| Polybutadiene Rubber [b] | 25.0 | 25.0 | 25.0 |
| Carbon Black [c] | 75.0 | 45.0 | 45.0 |
| Polysaccharide A [d] | 0.0 | 20.0 | 0.0 |
| Polysaccharide B [d] | 0.0 | 0.0 | 20.0 |
| Silane coupling agent [e] | 0.0 | 0.0 | 0.0 |
| Processing Oil (TDAE) [f] | 10.0 | 10.0 | 0.0 |
| Curative (zinc oxide) [g] | 2.5 | 2.5 | 2.5 |
| Microcrystalline Wax [h] | 2.0 | 2.0 | 2.0 |
| Antidegradant [i] | 2.0 | 2.0 | 2.0 |
| Antioxidant [j] | 0.5 | 0.5 | 0.5 |

TABLE 5-continued

Rubber Compositions for Comparative Example A, Example 1A, and Example 1B

| Raw Materials | Comp. Ex. A (phr) | Example 1A (phr) | Example 1B (phr) |
|---|---|---|---|
| Curative (stearic acid) [k] | 2.0 | 2.0 | 2.0 |
| Processing aid [l] | 2.0 | 2.0 | 2.0 |
| Curative (sulfur) [m] | 2.0 | 2.0 | 2.0 |
| Accelerator CBS [n] | 1.7 | 1.7 | 1.7 |
| Accelerator DPG [o] | 2.0 | 2.0 | 2.0 |

Notes:
[a] Styrene Butadiene Rubber (Buna VSL 4526-2 HM, S-SBR) obtained from Lanxess.
[b] Cis 1,4 Polybutadinene (Budene 1207, BR) obtained from The GoodYear Tire and Rubber Company.
[c] Carbon black N-234 obtained from Sid Richardson Carbon and Energy Co.
[d] Polysaccharide obtained as described above.
[e] Silane coupling agent (Si 69) obtained from Evonik Industries
[f] Treated Distillate Aromatic Extract (TDAE) processing oils (tudalion SX oil) obtained from Ergon North and South America.
[g] Curative Zinc Oxide obtained from Harwick
[h] Microcrystalline wax (Nochek 4729A) obtained from Sovereign Chemical Company
[i] Antidegradant (Santoflex 6PPD) was obtained from Harwick
[j] Antioxidant (Wingstay 100) obtained from Harwick
[k] Stearic acid obtained from Harwick
[l] Processing aid (Struktol KK49) obtained from Struktol Company of America
[m] Sulfur curing agent was obtained from Harwick
[n] Sulfenamide (CBS) accelerator obtained from Harwick
[o] Guanmidine accelerator (DPG) obtained from Harwick
* Note:
SBR used here is an oil (treated distillate aromatic extract) extended rubber calculated to provide 75 phr pure SBR. Thus the total rubber polymer used here together with the polybutadine rubber is 100 phr.

In preparing the rubber compositions it was observed that Polysaccharide B had better processability and dispersion as compared to Polysaccharide A. The overall visual appearance including the surface smoothness, homogeneity, and color/shininess of the rubber composition containing Polysaccharide B (Example 1B) was better than that of the rubber composition containing Polysaccharide A (Example 1A).

Figure 1B:
FIG. 1B is a reproduction of a photograph of the rubber composition of Example 1B.

Good wetting of the wet polysaccharide by the rubber polymers was observed. Referring to FIGS. 1A and 1B, which show the compounded rubber composites of Examples 1A and 1B, respectively, it can be observed that the compounded rubber composition is homogeneous and non-porous. However, clear visual differences in the wetting of Polysaccharide A and Polysaccharide B reinforcing fillers with the rubber polymers is observed. It appears that Polysaccharide B was completely wetted as evidenced by the absence of white particles in FIG. 1B. The white spots observed in FIG. 1A for the rubber composition containing Polysaccharide A indicates relatively poor wetting.

Table 6 shows the performance characteristics of the rubber compositions of Comparative Example A, Example 1A, and Example 1B.

TABLE 6

Properties of Polysaccharide-Reinforced Rubber Compositions

| Property | Comp. Ex. A | Example 1A | Example 1B |
|---|---|---|---|
| Tensile strength at break (MPa) | 15.0 | 7.0 | 12.0 |
| Hardness (Shore A units) | 63.3 | 53.9 | 57.0 |
| Modulus (MPa) | 5.5 | 2.8 | 4.1 |
| Elongation (%) | 390.6 | 359.3 | 451.5 |
| Die C (N/mm) | 33.7 | 26.6 | 27.6 |
| Tan δ (60° C.) | 0.29 | 0.13 | 0.14 |

TABLE 6-continued

Properties of Polysaccharide-Reinforced Rubber Compositions

| Property | Comp. Ex. A | Example 1A | Example 1B |
|---|---|---|---|
| Cure time (min) | 12 | 10 | 10 |
| Rebound % (room temp) | 21.9 | 32.3 | 30.3 |
| Rebound % (0° C.) | 8.0 | 6.2 | 7.4 |
| Din abrasion (ARI, %) | 97.8 | 70.7 | 77.6 |
| Density (g/cc) | 1.13 | 1.10 | 1.11 |
| Min torque (S')(Nm) | 0.67 | 0.27 | 0.38 |

The following conclusions are drawn from the results in Table 6:

While there is minimal reduction in tensile strength of the polysaccharide-replaced formulations (Examples 1A and 1B) as compared to that of Comparative Example A, there is a higher magnitude improvement of elongation. Thus, the overall toughness of the polysaccharide formulated rubber compositions calculated as the area under the tensile strength versus elongation curve is even better than the base formulation (Comparative Example A).

The rolling resistance with polysaccharide and carbon black hybrid reinforcement has improved as shown with lower tan δ at 60° C. Loss modulus (Tan δ) is an indirect measure of hysteresis. The lower the tan δ as observed here, the lower the hysteresis and thus lower rolling resistance of the polysaccharide-formulated rubbers.

Rebound at room temperature is also indicative of rolling resistance. Higher rebound by the polysaccharide-containing rubber compositions observed here indicated an improvement in rolling resistance.

Rebound at 0° C. on the other hand indicates wet traction. The lower rebound observed here indicates that the polysaccharide reinforced rubber has improved the wet traction. The polar functional groups of polysaccharide have better affinity for water, as compared to the non-polar carbon black. This is believed to enhance penetration of water films on wet road surface resulting in better contact of the tire with the wet road.

Lower density was achieved in the polysaccharide formulated Examples 1A and 1B as compared to the incumbent formulation Comparative Example A. This is desirable in the tire industry as lighter end products and components translate to energy saving for the end user.

Lower torque (min S') indicates that there is a decrease in viscosity of the polysaccharide formulated rubbers compared to that of the Comparative Example A carbon black formulation. The lower viscosity of the formulation shows an improvement in processability.

Better dispersion of the Polysaccharide B in the rubber composition exhibited better hardness, tensile modulus, ultimate elongation, tear initiation and rebound properties as compared to the Polysaccharide A-based composition.

Despite the absence of processing aid in the Polysaccharide B rubber composition, significant reduction in torque that is indicative of reduction in viscosity was observed. Moreover, a significant increase in elongation of the formulated rubber was observed, suggesting that the colloidal Polysaccharide B is acting as a processing aid here.

Comparative Example B

Examples 2A and 2B

Replacing a Portion of Silica with Polysaccharide in Passenger Car Tread Rubber Composition Table 7 presents a silica-containing rubber formulation for passenger car tread applications, Comparative Example B. The baseline formulation, which does not contain polysaccharide, is composed of rubber ingredients reinforced with carbon black and silica hybrid fillers. The other two formulations in Table 7, Examples 2A and 2B, are rubber formulations in which 30% and 100%, respectively, of the silica in Comparative Example B was replaced with Polysaccharide B. The other ingredients in the rubber formulations are similar to those used in Comparative Example A and Examples 1A and 1B, except where noted.

TABLE 7

Rubber Compositions for Comparative Example B, Example 2A, and Example 2B

| Ingredient | Comp. Ex. B (phr) | Ex. 2A (phr) | Ex. 2B (phr) |
|---|---|---|---|
| Polymer 1 (Natural Rubber, Von Bundit, Thailand) | 75 | 75 | 75 |
| Polymer 2 (SBR) | 25 | 25 | 25 |
| Carbon black | 15 | 15 | 15 |
| Silica (Ultrasil 7000 gr, Evonik) | 65 | 45.7 | 0 |
| Polysaccharide B | 0 | 19.5 | 65 |
| Coupling agent | 5.2 | 5.2 | 5.2 |
| Process aid and wax | 12 | 12 | 12 |
| Antidegradants | 2.5 | 2.5 | 2.5 |
| Activators | 4.5 | 4.5 | 4.5 |
| Curative and accelerators | 5.7 | 5.7 | 5.7 |

Figure 2A:
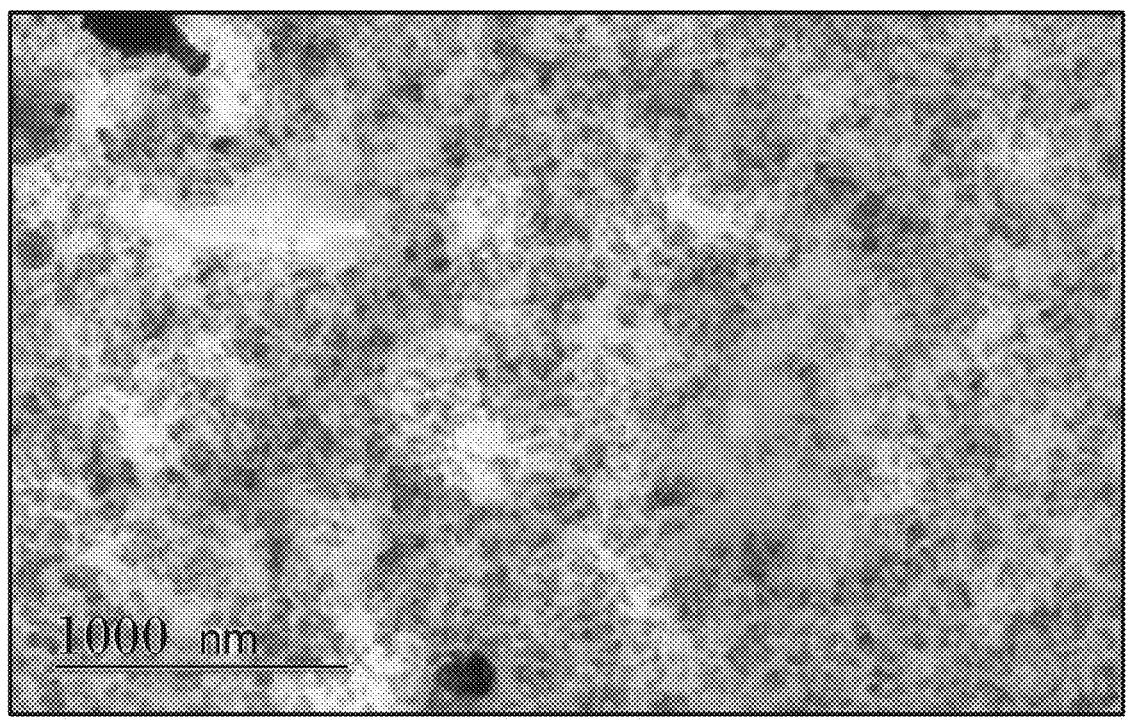
FIG. 2A is a reproduction of a transmission electron microscopy image of the silica-reinforced rubber composition of Comparative Example B.
Figure 2B:
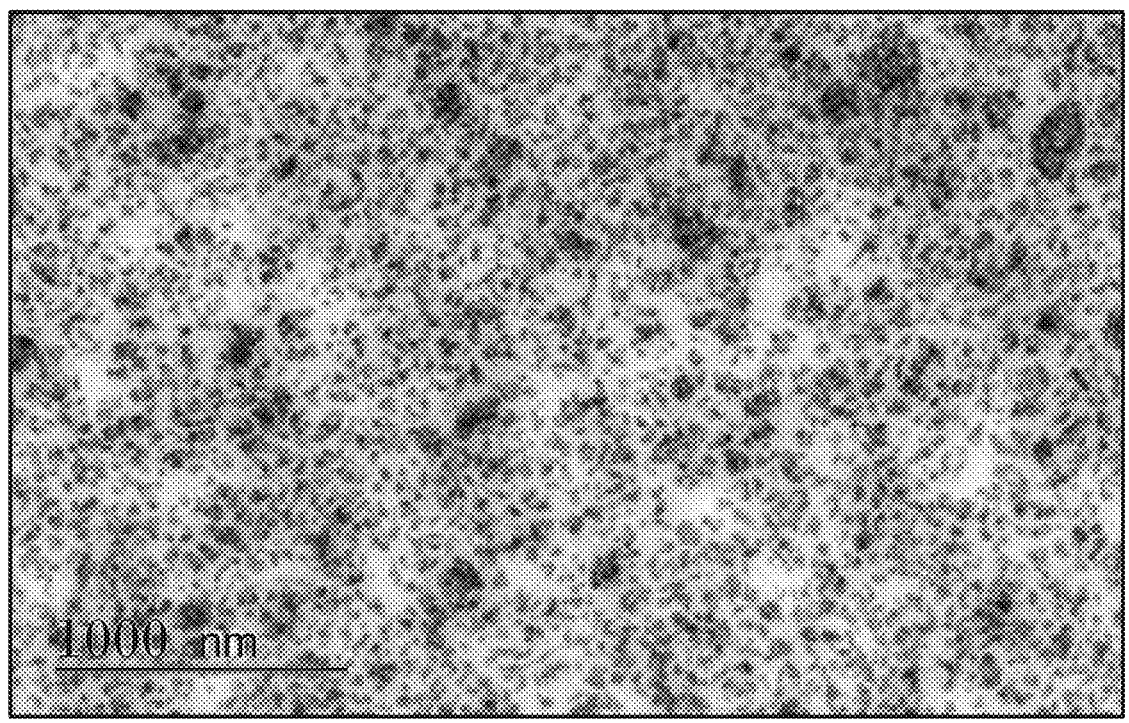
FIG. 2B is a reproduction of a transmission electron microscopy image of the rubber composition of Example 2A, which contains both silica and polysaccharide.

Transmission electron microscopy (TEM) studies were conducted on the compounded, cured rubber compositions. FIGS. 2A and 21B, which are TEM images of the rubber compositions of Comparative Example B and Example 2A (in which 30% of the silica was replaced with Polysaccharide B) respectively, clearly show excellent dispersion of polysaccharide in the rubber compositions. The polysaccharide is well dispersed well in the rubber composite, similar to the silica nanoparticles in Comparative Example B, which indicates goad compatibility between the polysaccharide and the rubber polymers. It is also noted that no significant agglomeration of polysaccharide particles was observed in the rubber formulation.

Table 8 shows the performance characteristics of the rubber compositions of Comparative Example B, Example 2A, and Example 2B.

TABLE 8

Properties of Polysaccharide-Reinforced Rubber Compositions

| Key Properties | Comp. Ex. B | Example 2A | Example 2B |
|---|---|---|---|
| Shore A hardness | 68 | 65 | 63 |
| Tensile Strength at break (MPa) | 18 | 12 | 14 |
| Tear Strength Die C | 25 | 23 | 21 |
| Abrasion Loss (mm$^3$) | 100 | 120 | 140 |

TABLE 8-continued

Properties of Polysaccharide-Reinforced Rubber Compositions

| Key Properties | Comp. Ex. B | Example 2A | Example 2B |
|---|---|---|---|
| MDR T90 (Cure Rate mm) | 18 | 18 | 16 |
| Modulus: 100% elongation (MPa) | 3.75 | 4.5 | 5.0 |
| Modulus: 200% Elongation (MPa) | 11.8 | 11.5 | 11.8 |
| Ultimate elongation (%) | 260 | 225 | 260 |
| Tan δ (60° C.) | 0.093 | 0.082 | 0.093 |

The following conclusions are drawn from the results in Table 8:
  Replacement of silica with polysaccharide has not changed the hardness, tear initiation measured as Die C, or ultimate elongation of the formulated rubber composition.
  A desirable increase in elongation, especially with an increased level of silica replacement, was noticed. A better elongation contributes to better toughness of the rubber compound.
  An important reduction in loss modulus (tan δ) at 60° C. was achieved with the replacement of silica with the polysaccharide. As such, the polysaccharide inclusion resulted in lower hysteresis of the formulated rubber that is expected to result in lower rolling resistance in tire applications.
  Processibility of the rubber compositions were not changed with the incorporation of polysaccharides. Also, consistent cure rate as compared to that of the baseline formulation was observed with the replacement of silica with polysaccharide.

The use of polysaccharide as a silica replacement in rubber compositions for passenger tire tread application is expected to improve the rolling resistance of tires as seen from the dynamic mechanical properties study. The addition of polysaccharide has also maintained most of the physical properties of the rubber composition. This is due to the good compatibility and dispersion of polysaccharide in the rubber compounds.

Comparative Example C

Examples 3A and 3B

Replacing a Portion of Carbon Black with Polysaccharides of Different Surface Area in Passenger Car Tire Tread Rubber Compositions In Examples 3A and 3B, two types of polysaccharides in wet form with relatively low and high surface area were used as partial replacement of carbon black (CB) reinforcing filler in the tire tread formulation of Comparative Example C. In Example 3A Polysaccharide B, having a surface area of 9.7 m²/g, was used to replace 20 phr of the carbon black of Comparative Example C, and in Example 3B Polysaccharide C, having a surface area of 19.4 m²/g as measured by Brunauer-Emmett-Teller (BET), was used to replace 20 phr of the carbon black of Comparative Example C. The remaining ingredients were similar to those of Comparative Example A, except where noted. The effect on the rubber processibility, curing behavior, static, and dynamic mechanical properties was studied.

Table 9 presents the rubber formulations and Table 10 shows the performance characteristics of the rubber compositions.

TABLE 9

Rubber Compositions for Comparative Example C, Example 3A, and Example 3B

| Raw Materials | Comp. Ex. C (phr) | Ex. 3A (phr) | Ex. 3B (phr) |
|---|---|---|---|
| SBR* | 103.12 | 103.12 | 103.12 |
| Polybutadiene Rubber | 25.0 | 25.0 | 25.0 |
| Carbon Black | 75.0 | 55.0 | 55.0 |
| Polysaccharide B | 0.0 | 20.0 | 0.0 |
| Polysaccharide C | 0.0 | 0.0 | 20.0 |
| Silane coupling agent | 7.0 | 7.0 | 7.0 |
| Processing Oil (TDAE) | 10.0 | 10.0 | 10.0 |
| Curative (zinc oxide) | 2.5 | 2.5 | 2.5 |
| Microcrystalline Wax | 2.0 | 2.0 | 2.0 |
| Antidegradant | 2.0 | 2.0 | 2.0 |
| Antioxidant | 0.5 | 0.5 | 0.5 |
| Curative (stearic acid) | 2.0 | 2.0 | 2.0 |
| Processing aid | 2.0 | 2.0 | 2.0 |
| Curative (sulfur) | 2.0 | 2.0 | 2.0 |
| Accelerator CBS | 1.7 | 1.7 | 1.7 |
| Accelerator DPG | 2.0 | 2.0 | 2.0 |

*SBR is extended with 28.2 TDAE. Thus total rubber polymer used here was 100 phr, and processing oil used was 38.2.

TABLE 10

Properties of Polysaccharide-Reinforced Rubber Compositions

| Key Properties | Comp. Ex. C (phr) | Example 3A (phr) | Example 3B (phr) |
|---|---|---|---|
| Hardness (Shore A units) | 63.9 | 66.8 | 65.6 |
| Tensile Strength at Break (MPa) | 15.15 | 14.35 | 15.36 |
| Modulus (MPa) | 5.46 | 6.38 | 7.12 |
| Elongation (%) | 294.1 | 276.4 | 281 |
| Die C (N/mm) | 29.6 | 28.0 | 28.4 |
| Max tan δ | 0.26 | 0.17 | 0.17 |
| Cure time (min) | 15.5 | 14 | 14.5 |
| Rebound % (room temp) | 31.8 | 30.0 | 31.2 |
| Rebound % (0° C.) | 7.33 | 7.25 | 7.54 |
| Din Abrasion (ARI, %) | 96.8 | 115.3 | 95.3 |
| Min Torque (S') (Nm) | 5.3 | 5.3 | 4.9 |

The following conclusions are drawn from the results in Table 10:
  The partial replacement of carbon black with polysaccharides slightly increased the hardness of the rubber composition, irrespective of the surface area of the polysaccharide.
  The incorporation of polysaccharides resulted in slight variation in tensile strength and elongation as compared to the incumbent carbon black based Comparative Example C. Use of the higher surface area polysaccharide resulted in better tensile strength and elongation in the rubber composition relative to that with the lower surface area, perhaps as a result of better interaction between the rubber polymers for the polysaccharide having higher surface area. Higher tensile strength and elongation is desirable in most rubber formulations as it implies higher toughness.
  Significant improvement in modulus was also observed as a result of the incorporation of the polysaccharide. The higher the surface area, the better the toughness in this observation. The higher surface area polysaccharide improved the tensile modulus of the comparative example rubber composition by about 30.4%.

The tear resistance, rebound, processability and cure properties of the polysaccharide-reinforced rubbers were very similar to that of Comparative Example C.

The reduction in hysteresis, measured as tan δ from dynamic mechanical property testing, is one of the most desirable properties. The partial replacement of carbon black with polysaccharide reduced the hysteresis properties by about 35%. This is a significant reduction in hysteresis of the rubber that would be expected to result in much lower heat buildup in various applications.

The abrasion resistance of rubber, which shows the ability of the rubber to resist surface wear caused by rubbing contact with another material and is indicative of fatigue life, is another important property. The lower surface area polysaccharide did not maintain the abrasion resistance of the incumbent carbon black formulation Comparative Example C. However, the higher surface area polysaccharide formulation resulted in abrasion resistance similar to that of Comparative Example C. This is clearly observed in the high surface area polysaccharide as it allowed better elastomer-polysaccharide interactions.

Power Transmission Belts

Most power transmission belts include an elastomeric belt and a tension cord. The elastomeric belt body typically includes one or more vulcanized rubber composition, or a thermoplastic elastomer, or other elastomeric composition. The elastomers include various reinforcements dispersed therein. Carbon black is one of the most common reinforcing fillers because of its offering to the various processing and performance needs. Excellent filler—elastomer interaction and adhesion, good dispersibility, reinforcing effect for wear and abrasion resistance and other physical properties, thermal and environmental resistance, lower density, and cost are among the factors considered in reinforcing agent selection. The following Examples demonstrate the use of enzyme-polymerized polysaccharide as a partial replacement of carbon black to make rubber compositions for hybrid power transmission belts using each of ethylene propylene diene monomer rubber, hydrogenated nitrile butadiene rubber, and Neoprene elastomer.

Comparative Example D

Examples 4A and 4B

Replacement of Carbon Black with Polysaccharide in Ethylene Propylene Diene Monomer Rubber (EPDM)-Based Rubber Composition for Power Transmission Belt Table 11 presents rubber formulations for use in a power transmission belt. The baseline formulation Comparative Example D is composed of rubber ingredients reinforced with carbon black and does not contain polysaccharide. The other two formulations in Table 11 are rubber formulations that replaced 30% (Example 4A) or 100% (Example 4B) of the carbon black in the Comparative Example D formulation with Polysaccharide B. EPDM was used as the rubber elastomer. The remaining ingredients such as processing oil, activators, curatives etc. were similar to those used in Comparative Example A, except where noted. Table 12 shows the performance characteristics of the rubber compositions.

TABLE 11

Rubber Compositions for Comparative Example D, Example 4A, and Example 4B

| Ingredient | Comp. Ex. D (phr) | Example 4A (phr) | Example 4B (phr) |
|---|---|---|---|
| EPDM (58% Ethylene) (Obtained from DMS Company Inc.) | 100 | 100 | 100 |
| Carbon Black (N330) | 65 | 45.7 | 0 |
| Polysaccharide B | 0 | 19.5 | 65 |
| Process Oil | 14 | 14 | 14 |
| Activators | 6 | 6 | 6 |
| Antidegredants and Curatives | 5 | 5 | 5 |

TABLE 12

Properties of Polysaccharide-Reinforced Rubber Compositions

| Key Properties | Comp. Ex D | Example 4A | Example 4B |
|---|---|---|---|
| Shore A Hardness | 63 | 58 | 50 |
| Tensile Strength at break (MPa) | 4.7 | 4.0 | 3.0 |
| Tear Strength (N/m) Die C | 23 | 15 | 15 |
| Abrasion Loss (mm3) | 150 | 250 | 400 |
| Min S' (lb-in) | 2.9 | 4.6 | 1.4 |
| MDR T'90 (Cure Rate mm) | 10 | 10.8 | 9 |
| Modulus at 100% elongation (MPa) | 1.2 | 1.2 | 0.8 |
| Modulus at 200% elongation (MPa) | 1.6 | 1.8 | 0.8 |
| Ultimate elongation (%) | 700 | 420 | 1400 |
| Tan δ (60° C.) | 0.257 | 0.245 | 0.234 |

The following observations are drawn from the results in Table 12:

- A desirable decrease in loss modulus (hysteresis) was observed at 60° C. as a result of polysaccharide replacement of the carbon black. This suggests that the polysaccharide contributes to the reduction in heat buildup in the power transmission belt applications that will result in prolonged life.
- Polysaccharide replacement of carbon black in EPDM rubber formulations resulted in undesirable increase in abrasion loss and tear resistance measured as (Die C).
- Minimal reduction in Shore A hardness and tensile strength was also observed, especially at higher polysaccharide loading
- Lower polysaccharide loading did not affect the modulus. However, the complete replacement of carbon black with polysaccharide resulted in a significant modulus reduction.
- While reductions in the ultimate elongation was observed at lower level replacement of carbon black with polysaccharide, a dramatic increase of ultimate elongation was observed at higher level of polysaccharide loading.
- The cure rate of the rubber compositions remained similar between the control (Comparative Example D) and the polysaccharide-containing formulations Example 4A and Example 4B, irrespective of polysaccharide loading.
- The torque (min S') initially showed an increase, but it started to reduce with an increase in polysaccharide loading showing an ease in processability.

The incorporation of polysaccharide in ethylene propylene diene monomer rubber (EPDM) based power transmission belt formulations significantly improved the elasticity and reduced the heat buildup relative to the control formulation. These improvements are desirable as the improvement in elasticity is expected to improve the impact resistance and overall toughness of the rubber, and the lower hysteresis is expected to result in improvement in the overall life time of the belt.

Comparative Example E

Examples 5A and 5B

Replacement of Carbon Black with Polysaccharide in Hydrogenated Nitrile Butadiene Rubber (HNBR)-Based Rubber Composition for Power Transmission Belt Table 13 presents rubber compositions based on HNBR for use in a power transmission belt. The baseline formulation Comparative Example E is composed of rubber ingredients reinforced with carbon black. The other two formulations in Table 13 are rubber formulations in which Polysaccharide B replaced 10% (Example 5A) and 100% (Example 5B) of the carbon black in the Comparative Example E formulation. The remaining ingredients were similar to those used in Comparative Example A, except where noted. Table 14 shows the performance characteristics of the rubber compositions.

TABLE 13

Rubber Compositions for Comparative Example E, Example 5A, and Example 5B

| Ingredient | Comp. Ex. E (phr) | Ex. 5A (phr) | Ex. 5B (phr) |
| --- | --- | --- | --- |
| HNBR (Zetpol 20201) (obtained from Zeon Chemicals) | 100 | 100 | 100 |
| Carbon Black (N330) | 50 | 45 | 0 |
| Polysaccharide B | 0 | 5 | 50 |
| Process Oil (Dioctyl Sebacate) | 8 | 8 | 8 |
| Activators and antidegredants (ZnO & Stearic Acid, TMQ) | 8 | 8 | 8 |
| Accelerators and curatives (MBTS, TMTD & Sulfur) | 3.5 | 3.5 | 3.5 |

TABLE 14

Properties of Polysaccharide-Reinforced Rubber Compositions

| Key Properties | Comp. Ex. E | Example 5A | Example 5B |
| --- | --- | --- | --- |
| Shore A hardness | 71 | 70 | 50 |
| Tensile strength (MPa) | 26 | 24.5 | 19 |
| Tear strength (N/m) (Die C) | 44 | 46 | 30 |
| Abrasion Loss (mm$^3$) | 75 | 80 | 90 |
| Min S' (lb-in) | 3.9 | 3.8 | 3 |
| MDR T90 (Cure Rate min) | 5 | 6 | 7 |
| Modulus at 200% elongation (MPa) | 9 | 8 | 2 |

The following observations are drawn from the results in Table 14:
Low level polysaccharide replacement of carbon black in HNBR formulation maintained the tear properties, tensile properties, and dynamic mechanical properties of the rubber composition.
Higher level polysaccharide loading resulted in slight increase in abrasion loss, decrease in shore hardness, reduction in tensile strength and tear initiation.
Overall, polysaccharide loading in HNBR improved the rolling resistance as shown by the reduction in the loss modulus (tan δ). As the polysaccharide loading increased, further improvement in rolling resistance was observed.
The use of polysaccharide has improved the strain rate of the formulated HNBR based power belt formulation. Higher polysaccharide loading favors more elongation.
The viscosity (min S') of the formulation exhibited a slight reduction, showing that the incorporation of polysaccharide favors ease of processibility.

Lower level replacement of carbon black with polysaccharides in HNBR power transmission belt formulations can reduce the rubber hysteresis while maintaining all of the physical properties. Higher level or complete replacement of carbon black with polysaccharide can also reduce the rubber hysteresis and improve the elongation that is expected to result in better rubber toughness. However, such higher level or complete carbon black replacement could result in deterioration of physical properties such as hardness, tensile strength and abrasion resistance.

Comparative Example F

Examples 6A and 6B

Replacement of Carbon Black with Polysaccharide in Neoprene-Based Rubber Composition for Power Transmission Belt Table 15 presents neoprene rubber-based formulations for use in a power transmission belt. The baseline formulation Comparative Example F is composed of rubber ingredients reinforced with carbon black. The other two formulations presented in Table 15 are rubber formulations in which Polysaccharide B replaced 45% (Example 6A) and 100% (Example 6B) of the carbon black in the Comparative Example F formulation. The remaining rubber ingredients were similar to those used in Comparative Example A, except where noted. Table 16 shows the performance characteristics of the rubber compositions.

TABLE 15

Rubber Compositions for Comparative Example F, Example 6A, and Example 6B.

| Ingredient | Comp. Ex. F (phr) | Ex. 6A (phr) | Ex. 6B (phr) |
| --- | --- | --- | --- |
| Neoprene (obtained from Dongbu Fine Chemicals) | 100 | 100 | 100 |
| Carbon black (N550) | 55 | 30.25 | 0 |
| Polysaccharide B | 0 | 24.75 | 55 |
| Process Oil (Naphthenic acid) | 5 | 5 | 5 |
| Activators and anti-degredants (MgO & Stearic Acid, ODP) | 8 | 8 | 8 |
| Curative (ZnO) | 5 | 5 | 5 |

TABLE 16

Properties of Polysaccharide-Reinforced Rubber Compositions

| Key Properties | Comp. Ex. F | Example 6A | Example 6B |
|---|---|---|---|
| Shore A Hardness | 76 | 72 | 71 |
| Tensile Strength at break (MPa) | 18 | 16 | 13 |
| Tear Strength (N/m): Die C/Die T | 40/7 | 40/11 | 45/22 |
| Abrasion Loss (mm3) | 100 | 175 | 220 |
| MDR T90 (Cure Rate mm) | 8.5 | 14 | 9 |
| Modulus at 100% elongation (MPa) | 7 | 4.5 | 3 |
| Modulus at 200% elongation (MPa) | 17 | 8 | 5 |
| Min S' (lb-in) | 6 | 5.3 | 4 |
| Ultimate elongation (%) | 250 | 450 | 780 |
| Tan δ (60° C.) | 0.080 | 0.120 | 0.150 |

The following observations are drawn from the results in Table 16:

A pronounced improvement in the ultimate elongation of neoprene-based power belt formulation was achieved with the replacement of carbon black with polysaccharide. The improvement continued with an increased level of carbon black replacement with polysaccharide. This indicates that the polysaccharide formulated neoprene rubber is a softer material. As expected, the softness prompted reduction in abrasion resistance. However, it is expected that the polysaccharide will improve the impact resistance of the neoprene formulation.

The tear initiation properties (Die C) of the neoprene-based formulation were maintained with an intermediate level of e replacement of carbon black with polysaccharide. An increase in tear strength was observed with an increase of polysaccharide loading.

The tear propagation strength, Die T, showed a dramatic increase with the use of polysaccharide in place of carbon black. This continued to improve with an increase in polysaccharide loading.

While the cure rate remained indifferent to the replacement of carbon black with polysaccharide, the torque (min S') exhibited slight reduction indicating better processibility with the incorporation of polysaccharide.

Comparative Example G

Examples 7A and 7B

Partial Replacement of Carbon Black with Polysaccharide, with and without Replacement of Silane by Polyetheramine Table 17 presents the baseline formulation Comparative Example G, which is composed of rubber ingredients reinforced with carbon black, the formulation of Example 7A in which a portion of the carbon black is replaced with Polysaccharide B and the silane coupling agent is replaced with a polyetheramine coupling agent, and the formulation of Example 7B in which the carbon black is partially replaced with Polysaccharide D. The polyetheramine used was JEFFAMINE® D-230, which is a diamine with a polypropylene glycol backbone and a molecular weight of 230 g/mole. Table 18 shows the performance characteristics of the rubber-polysaccharide compositions.

TABLE 17

Compositions for Comparative Example G, Example 7A, and Example 7B

| Ingredients | Comp. Ex. G (phr) | Example 7A (phr) | Example 7B (phr) |
|---|---|---|---|
| SBR* | 103.12 | 103.12 | 103.12 |
| Polybutadiene Rubber | 25.0 | 25.0 | 25.0 |
| Carbon Black | 75.0 | 55.0 | 55.0 |
| Polysaccharide B | 0.0 | 20.0 | 0.0 |
| Polysaccharide D | 0.0 | 0.0 | 20.0 |
| Silane coupling agent | 7.0 | 0.0 | 7.0 |
| Polyetheramine coupling agent (JEFFAMINE ® D-230, Huntsman Inc.) | 0.0 | 7.0 | 0.0 |
| Processing Oil (TDAE) | 10.0 | 10.0 | 10.0 |
| Curative (zinc oxide) | 2.5 | 2.5 | 2.5 |
| Microcrystalline Wax | 2.0 | 2.0 | 2.0 |
| Antidegradant | 2.0 | 2.0 | 2.0 |
| Antioxidant | 0.5 | 0.5 | 0.5 |
| Curative (stearic acid) | 2.0 | 2.0 | 2.0 |
| Processing aid | 2.0 | 2.0 | 2.0 |
| Curative (sulfur) | 2.0 | 2.0 | 2.0 |
| Accelerator CBS | 1.7 | 1.7 | 1.7 |
| Accelerator DPG | 2.0 | 2.0 | 2.0 |

*SBR is extended with 28.2 TDAE. Thus total rubber polymer used here was 100 phr, and processing oil used was 38.2 phr.

TABLE 18

Properties of Polysaccharide-Reinforced Rubber Compositions

| Key Properties | Comp. Ex. G (phr) | Example 7A (phr) | Example 7B (phr) |
|---|---|---|---|
| Tan Delta (60° C.) | 0.16 | 0.34 | 0.20 |
| Min torque (S') (Nm) | 0.49 | 0.88 | 0.58 |
| Cure time (min) | 15.5 | 8.5 | 16 |
| Die C (N/mm) | 29.6 | 32.7 | 29.1 |
| Hardness (Shore A units) | 63.9 | 64.3 | 68.1 |
| Tensile strength at break (MPa) | 15.2 | 14.0 | 14.2 |
| % Strain at Auto. Break (%) | 294.1 | 524.8 | 272.7 |
| Modulus (MPa) | 7.12 | 3.57 | 6.15 |
| Energy under stress-stain curve (J) | 9.97 | 14.77 | 8.89 |
| Abrasion loss (mm3) | 96.8 | 157.4 | 117.0 |
| Rebound (%, room temperature) | 31.85 | 22.04667 | 30.61 |

The following conclusions are drawn from the results in Table 18:

The use of polyetheramine instead of silane as coupling agent between glucan reinforcing fillers and the rubber compounds (Example 7A) improved the elongation of the formulation by 78.4% as compared to the incumbent formulation (Comparative Example G). The increase in elongation of this formulation was also accompanied by a tensile strength very similar to the incumbent formulation. This implies that the toughness of the formulation has improved significantly. The toughness calculated as the energy under the stress-strain curve indicates that the formulation has improved the toughness of the incumbent formulation (Comparative Example G) by about 48.1%. Moreover, there is a slight improvement in tear strength (Die C) as a result of the use of the polyetheramine.

The increase in hysteresis (Tan δ) observed with the use of polyetheramine as coupling agent or additive in rubber formulations may not be desirable for tire tread applications. However, such formulations could be useful in belt applications owing to their toughness.

The dramatic reduction in cure time (88%) and an increase in viscosity (Min torque) in Example 7A as compared to the base formulation (Comparative Example G) suggests a chemical interaction between the polyetheramines and the ingredients of the rubber formulations. A reduction in cure time is generally desired in the industry as it means savings in time and energy to process the material.

The use of Polysaccharide D as partial replacement of carbon black in the rubber formulation (Example 7B) has maintained the tear strength (Die C), cure time, tensile strength and rebound of the base formulation (Comparative Example G).

Comparative Example H

Examples 8A, 8B, 8C, and 8D

Partial Replacement of Carbon Black with Polysaccharide and Replacement of Silane with Varying Amounts of Polyetheramine Table 19 presents the baseline formulation Comparative Example H, which is composed of rubber ingredients reinforced with carbon black, and the formulations of Examples 8A, 8B, 8C, and 8D. In these Examples, a portion of the carbon black is replaced with Polysaccharide D and various amounts of a polyetheramine coupling agent are used in place of the silane coupling agent. The polyetheramine used was JEFFAMINE® D-230, which is a diamine with a polypropylene glycol backbone and a molecular weight of 230 g/mole. Table 20 shows the performance characteristics of the rubber-polysaccharide compositions.

TABLE 19

Compositions for Comparative Example H, Example 8A, Example 8B, Example 8C and Example 8D

| Ingredients | Comp. Ex. H (phr) | Example 8A (phr) | Example 8B (phr) | Example 8C (phr) | Example 8D (phr) |
|---|---|---|---|---|---|
| SBR* | 103.12 | 103.12 | 103.12 | 103.12 | 103.12 |
| Polybutadiene Rubber | 25.0 | 25.0 | 25.0 | 25.0 | 25.0 |
| Carbon Black | 75.0 | 55.0 | 55.0 | 55.0 | 55.0 |
| Polysaccharide D | 0.0 | 20.0 | 20.0 | 20.0 | 20.0 |
| Silane coupling agent | 7.0 | 0.0 | 0.0 | 0.0 | 0.0 |
| Polyetheramine coupling agent (JEFFAMINE ® D-230, Huntsman Inc.) | 0.0 | 2.5 | 7.5 | 12.5 | 20 |
| Processing Oil (TDAE) | 10.0 | 10.0 | 10.0 | 10.0 | 10.0 |
| Curative (zinc oxide) | 2.5 | 2.5 | 2.5 | 2.5 | 2.5 |
| Microcrystalline Wax | 2.0 | 2.0 | 2.0 | 2.0 | 2.0 |
| Antidegradant | 2.0 | 2.0 | 2.0 | 2.0 | 2.0 |
| Antioxidant | 0.5 | 0.5 | 0.5 | 0.5 | 0.5 |
| Curative (stearic acid) | 2.0 | 2.0 | 2.0 | 2.0 | 2.0 |
| Processing aid | 2.0 | 2.0 | 2.0 | 2.0 | 2.0 |
| Curative (sulfur) | 2.0 | 2.0 | 2.0 | 2.0 | 2.0 |
| Accelerator CBS | 1.7 | 1.7 | 1.7 | 1.7 | 1.7 |
| Accelerator DPG | 2.0 | 2.0 | 2.0 | 2.0 | 2.0 |

*SBR is extended with 28.2 TDAE. Thus total rubber polymer used here was 100 phr, and processing oil used was 38.2.

TABLE 20

Properties of Polysaccharide-Reinforced Rubber Compositions Containing Polyetheramines as Coupling Agents

| Key Properties | Comp. Ex. H | Example 8A | Example 8B | Example 8C | Example 8D |
|---|---|---|---|---|---|
| Tan Delta (60° C.) | 0.16 | 0.24 | 0.26 | 0.29 | 0.37 |
| Min torque (S') (Nm) | 0.49 | 3.47 | 3.47 | 3.16 | 3.10 |
| Cure time (min) | 15.5 | 12.5 | 10.3 | 8.3 | 7.0 |
| Die C (N/mm) | 29.6 | 29.6 | 28.0 | 27.1 | 24.7 |
| Hardness (Shore A units) | 63.9 | 59.9 | 55.1 | 50.27 | 41.45 |
| Tensile strength at break (MPa) | 13.5 | 11.43 | 12.1 | 11.51 | 8.87 |
| Elongation at Auto. Break (%) | 294.1 | 469.8 | 613.2 | 754.4 | 903.4 |
| Modulus (MPa) | 7.12 | 3.25 | 3.13 | 2.94 | 2.34 |
| Energy under stress-stain curve (J) | 9.97 | 12.26 | 14.77 | 15.87 | 13.91 |
| Abrasion loss (mm3) | 96.8 | 136.7 | 157.4 | 249.3 | — |
| Rebound (%, room temperature) | 31.85 | 26.48 | 23.60 | 21.83 | 23.53 |
| Slurry jet erosion (weight loss, %) | 0.23 | 0.14 | 0.07 | 0.06 | — |

The following conclusions are drawn from the results in Table 20:

The use of polyetheramine instead of silane as coupling agent between polysaccharide reinforcing fillers and the rubber compounds (Examples 8A, 81B, 8C and 8D) dramatically improved the elongation of the rubber-polysaccharide formulations. The use of only 2.5 phr polyetheramine (Example 8A) instead of 7 phr silane (Comparative Example H) increased the elongation at break of the formulated rubber by 59.7% (as shown in Table 20). Similarly, the use of 7.5 phr polyetheramines (Example 81B), 12.5 phr polyetheramines (Example 8C), and 20 phr polyetheramines (Example 8D) resulted in an improvement of elongation by 134.5%, 188.5% and 245.5%, respectively as compared to that of the control formulation (Comparative Example H) which contained no polysaccharide and no polyetheramine. The use of polyetheramines slightly reduced the tensile strength of the rubber formulation. However, the overall toughness, calculated as the area under the stress-strain curve, of the rubber-polysaccharide formulation improved significantly with the use of polyetheramines. There was no statistically observable change in the tear strength (measured as Die C) between the control formulation and the formulations containing polyetheramines.

The increase in hysteresis (Tan δ) observed with the use of polyetheramines as coupling agents or additives in rubber formulations may not be desirable for tire tread applications. However, such formulations could be useful in other applications where rolling resistance is of minor importance, and toughness and flexibilities are desirable performances. For instance, such rubber-polysaccharide formulations could be useful in shoe soles, conveyer belt lining and other applications owing to their improved flexibility, better toughness, and enhanced erosion resistance as measured by slurry jet erosion testing.

The dramatic and unanimous reduction in cure time and an increase in viscosity (Min torque) in Examples 8A, 8B, 8C and 8D of the rubber-polysaccharide formulations as compared to that of the control formulation (Comparative Example H) suggests a chemical interaction between the polyetheramines and the ingredients of the rubber formulations. A reduction in cure time is generally desired in the industry as it means savings in time and energy to process the material.

Figure 3A:
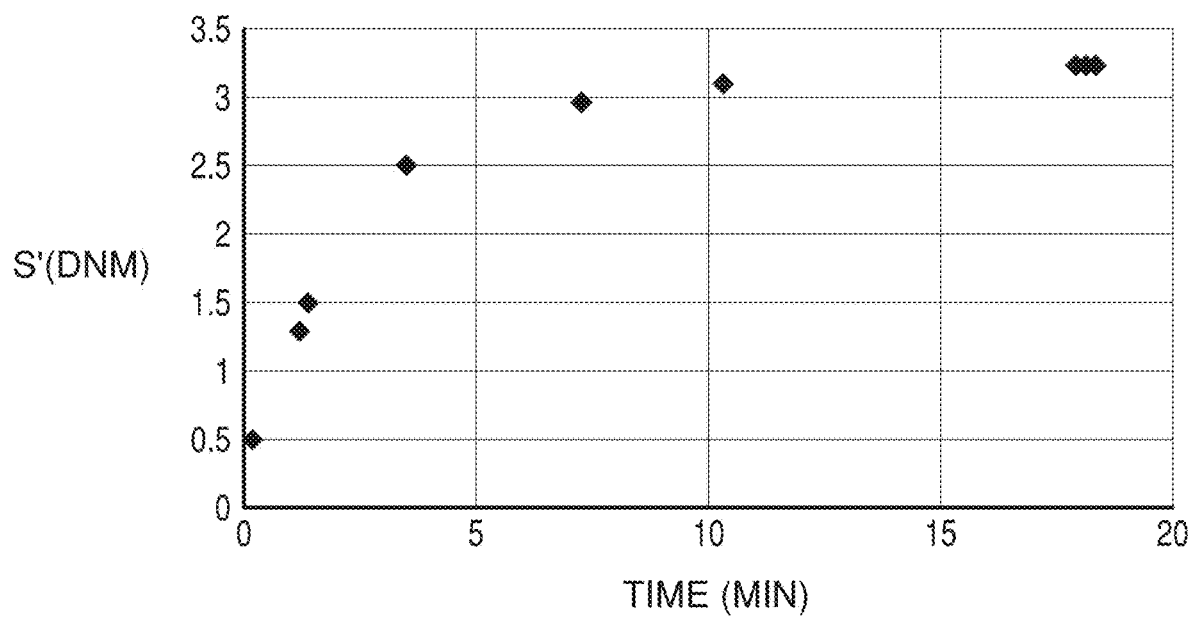
FIG. 3A is a graphical representation of the cure curve for the rubber composition of Comparative Example H.
Figure 3B:
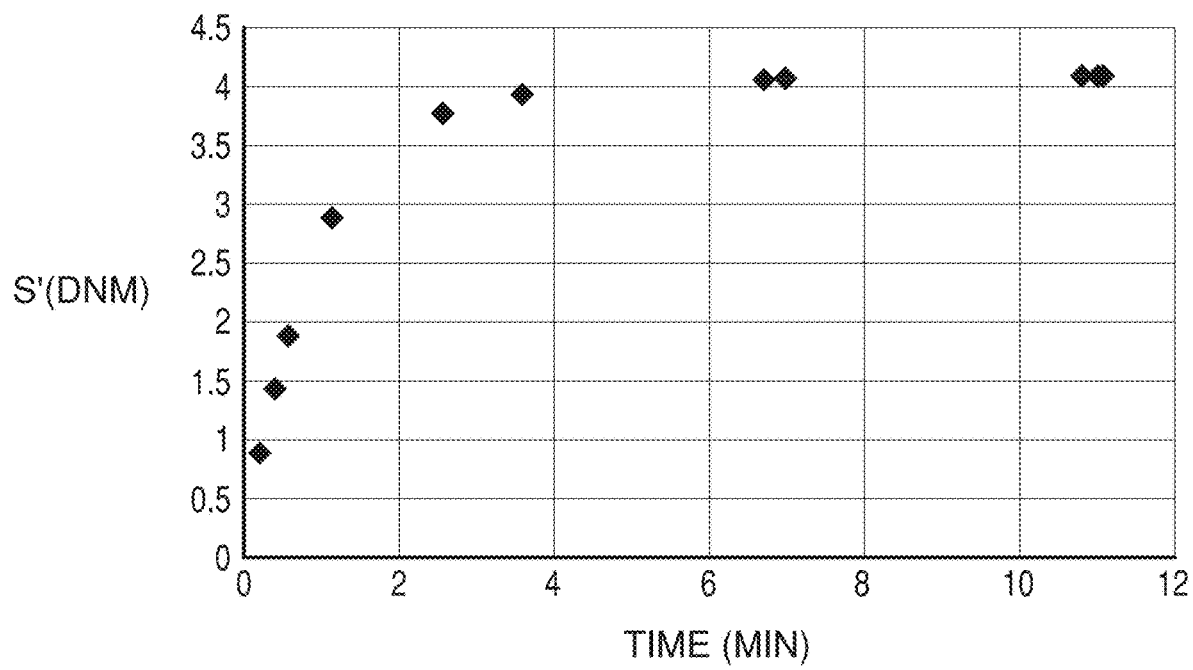
FIG. 3B is a graphical representation of the cure curve for the rubber-polysaccharide composition of Example 8B.

FIGS. 3A and 3B show the cure curve as an increase in torque (S') as a function of time for the base formulation (Comparative Example H) and the formulation containing polyetheramine and Polysaccharide D (Example 8B), respectively. These results were collected from RPA testing. Comparison of the two figures shows that the torque peaked at about 5 minutes and flattened out for Example 8B, while in the case of Comparative Example H the torque started to peak after 10 minutes from the start of the testing. This implies that the polyetheramine interacts with the composition of the rubber formulations and promotes the vulcanization process by shortening the cure time.

Comparative Example J

Example 9 and Example 10

Table 21 shows the baseline formulation Comparative Example J, which is composed of rubber ingredients reinforced with carbon black, and the formulations of Example 9 and Example 10. The superscripts in Table 21 have the same meaning as those in Table 5. In Example 9, a portion of the carbon black is replaced with low molecular weight, insoluble cellulose having a cellulose II crystal structure (prepared according to WO 2016/106011, Example 3) in wet cake form. In Table 21 and below, this cellulose is referred to as "enzymatic cellulose", or as "enzymatically polymerized cellulose". In Example 10, a portion of the carbon black is replaced with poly alpha-1,3-glucan in fibrid form (prepared according to WO 2016/196022, Example 2). The rubber formulations were prepared following the same procedure used in Comparative Example A and Examples 1A and 1B. Table 22 shows the performance characteristics of the comparative rubber composition and the rubber-polysaccharide compositions.

TABLE 21

Compositions for Comparative Example J, Example 9, and Example 10

| Raw Materials | Comp. Ex. J (phr) | Example 9 (phr) | Example 10 (phr) |
|---|---|---|---|
| SBR [a, *] | 103.12 | 103.12 | 103.12 |
| Polybutadiene Rubber | 25.0 | 25.0 | 25.0 |
| Carbon Black [c] | 75.0 | 55.0 | 55.0 |
| Enzymatic cellulose | 0.0 | 20.0 | 0.0 |
| Poly alpha-1,3-glucan Fibrids | 0.0 | 0.0 | 20.0 |
| Silane coupling agent | 7 | 7 | 7 |
| Processing Oil (TDAE) | 10.0 | 10.0 | 10.0 |
| Curative (zinc oxide) [g] | 2.5 | 2.5 | 2.5 |
| Microcrystalline Wax [h] | 2.0 | 2.0 | 2.0 |
| Antidegradant [i] | 2.0 | 2.0 | 2.0 |
| Antioxidant [j] | 0.5 | 0.5 | 0.5 |
| Curative (Stearic acid) | 2.0 | 2.0 | 2.0 |
| Processing aid [l] | 2.0 | 2.0 | 2.0 |
| Curative (sulfur) [m] | 2.0 | 2.0 | 2.0 |
| Accelerator CBS [n] | 1.7 | 1.7 | 1.7 |
| Accelerator DPG [o] | 2.0 | 2.0 | 2.0 |

TABLE 22

Properties of Polysaccharide-Reinforced Rubber Compositions

| Property | Comp. Ex. J | Example 9 | Example 10 |
|---|---|---|---|
| Tensile strength at break (MPa) | 15.4 | 12.7 | 9.7 |
| Hardness (Shore A units) | 61.1 | 53.4 | 57.4 |
| Modulus (MPa) | 5.8 | 5 | 4.1 |
| Elongation (%) | 322 | 324 | 282 |
| Tan delta (60° C.) | 0.22 | 0.13 | 0.13 |
| Rebound % (room temp) | 23.22 | 28.2 | 41 |
| Rebound % (0° C.) | 7.5 | 7.6 | 7.6 |
| Abrasion loss (mm^3) | 150 | 172 | 196 |
| Min torque (S') (Nm) | 0.22 | 0.13 | 0.12 |

The results for Examples 9 and 10 show that while, the formulations where carbon black was partially replaced with poly alpha-1,3-glucan fibrid (Example 10) or enzymatically polymerized cellulose (Example 9) show minor reduction in tensile strength and modulus, the formulations also show improved rolling resistance relative to that of Comparative Example J with 75 phr carbon black. Loss modulus (Tan δ) is an indirect measure of hysteresis. The lower the tan δ as observed here, the lower the hysteresis and thus lower rolling resistance of the polysaccharide-formulated rubbers. Rebound at room temperature is also indicative of rolling resistance. Higher rebound at room temperature by the polysaccharide-containing rubber compositions observed here indicates an improvement in rolling resistance of that of Comparative Example J, which did not contain any polysaccharide. Polysaccharide polymers have an intrinsically lower density compared to carbon black, thus, the polysaccharide-formulated Examples have lower density consequently. This is desirable in the tire industry as lighter end products and components translate to energy saving for the end user.

What is claimed is:

1. A rubber composition comprising:
   (a) a rubber component, and
   (b) a poly alpha-1,3-glucan ester compound, wherein at least 50% of the glycosidic linkages of the poly alpha-1,3-glucan ester compound are alpha-1,3 glycosidic linkages;
   wherein the poly alpha-1,3-glucan ester compound is represented by the structure:

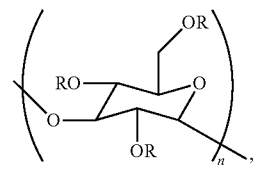

wherein
   (i) n is at least 6,
   (ii) each R is independently an —H or a first group comprising —CO—$C_x$—COOH, wherein the —$C_x$— portion of said first group comprises a chain of 2 to 18 carbon atoms, and
   (iii) the poly alpha-1,3-glucan ester compound has a degree of substitution with the first group of 0.001 to 0.1.

2. The rubber composition of claim 1, wherein the rubber component comprises at least one diene-based sulfur-vulcanizable elastomer having a glass transition temperature (Tg) below −30° C. as determined by dynamic mechanical analysis.

3. The rubber composition of claim 2, wherein the elastomer comprises natural rubber, synthetic polyisoprene, styrene butadiene copolymer rubber, ethylene propylene diene monomer rubber, hydrogenated nitrile butadiene rubber, polybutadiene, or neoprene.

4. The rubber composition of claim 1, wherein the poly alpha-1,3-glucan ester compound comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, or poly alpha-1,3-glucan 2-octen-1-yl succinate.

5. The rubber composition of claim 1, wherein at least 90% of the glycosidic linkages of the poly alpha-1,3-glucan ester compound are alpha-1,3 glycosidic linkages.

6. The rubber composition of claim 1, wherein the rubber composition comprises about 5 to about 100 parts per hundred of the poly alpha-1,3-glucan ester compound, based on the weight fraction of the rubber component.

7. The rubber composition of claim 1, further comprising at least one of carbon black or silica.

8. The rubber composition of claim 1, further comprising at least one of a filler, antioxidant, antiozonant, processing aid, compatibilizer, bonding agent, tackifier, curing agent, accelerator, or coupling agent.

9. The rubber composition of claim 1, further comprising a polyetheramine.

10. The rubber composition of claim 8, wherein the rubber composition comprises the coupling agent, and the coupling agent comprises an organic silane compound having an organic moiety capable of reacting with a polymer, wherein the organic moiety is selected from a sulfide group, amino group, mercapto group, vinyl group, methacryl group, epoxy group, halogen, or alkoxy group.

11. The rubber composition of claim 8, wherein the rubber composition comprises the coupling agent, and the coupling agent comprises bis(3-triethoxysilylpropyl)tetrasulfide, bis(3-triethoxysilylpropyl)disulfide, bis(2-triethoxysilylethyl) tetrasulfide, 3-mercaptopropyl trimethoxysilane, 3-mercaptopropyl triethoxysilane, 3-nitropropyl trimethoxysilane, or 3-aminopropyl triethoxysilane.

12. The rubber composition of claim 1, wherein the rubber component comprises silicone rubber elastomer.

13. A rubber composition comprising:
(a) a rubber component, and
(b) a poly alpha-1,3-glucan ester compound, wherein at least 50% of the glycosidic linkages of the poly alpha-1,3-glucan ester compound are alpha-1,3 glycosidic linkages;

wherein the poly alpha-1,3-glucan ester compound is represented by the structure:

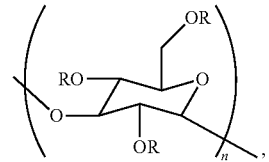

wherein
(i) n is at least 6,
(ii) each R is independently an —H or a first group comprising —CO—$C_x$—COOH, wherein the —$C_x$— portion of said first group comprises a chain of 2 to 18 carbon atoms, and
(iii) the poly alpha-1,3-glucan ester compound has a degree of substitution with the first group of 0.001 to 3.

14. The rubber composition of claim 13, wherein the poly alpha-1,3-glucan ester compound comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, or poly alpha-1,3-glucan 2-octen-1-yl succinate.

15. The rubber composition of claim 13, wherein at least 90% of the glycosidic linkages of the poly alpha-1,3-glucan ester compound are alpha-1,3 glycosidic linkages.

16. The rubber composition of claim 13, wherein the rubber composition comprises about 5 to about 100 parts per hundred of the poly alpha-1,3-glucan ester compound, based on the weight fraction of the rubber component.

17. The rubber composition of claim 13, further comprising at least one of carbon black or silica.

18. The rubber composition of claim 13, wherein the rubber component comprises at least one diene-based sulfur-vulcanizable elastomer having a glass transition temperature (Tg) below −30° C. as determined by dynamic mechanical analysis.

19. The rubber composition of claim 18, wherein the elastomer comprises natural rubber, synthetic polyisoprene, styrene butadiene copolymer rubber, ethylene propylene diene monomer rubber, hydrogenated nitrile butadiene rubber, polybutadiene, or neoprene.

20. The rubber composition of claim 13, wherein the rubber component comprises silicone rubber elastomer.

21. An article comprising the rubber composition of claim 1.

22. The article of claim 21, wherein the article is a tire, belt, seal, footwear, valve, tubing, mat, gasket, coating, film, or adhesive.

23. An article comprising the rubber composition of claim 13.

24. The article of claim 23, wherein the article is a tire, belt, seal, footwear, valve, tubing, mat, gasket, coating, film, or adhesive.

* * * * *